Sept. 3, 1935. J. K. DARBY Re. 19,686

PLANT AND APPARATUS FOR MAKING PAPER

Original Filed Sept. 24, 1928 16 Sheets-Sheet 1

INVENTOR
James K. Darby
BY
D. B. Whistler
ATTORNEY

Sept. 3, 1935. J. K. DARBY Re. 19,686

PLANT AND APPARATUS FOR MAKING PAPER

Original Filed Sept. 24, 1928 16 Sheets-Sheet 2

INVENTOR
James K. Darby
BY
ATTORNEY

Sept. 3, 1935. J. K. DARBY Re. 19,686

PLANT AND APPARATUS FOR MAKING PAPER

Original Filed Sept. 24, 1928 16 Sheets-Sheet 3

INVENTOR
James K. Darby
BY
ATTORNEY

Sept. 3, 1935. J. K. DARBY Re. 19,686
PLANT AND APPARATUS FOR MAKING PAPER
Original Filed Sept. 24, 1928 16 Sheets-Sheet 4
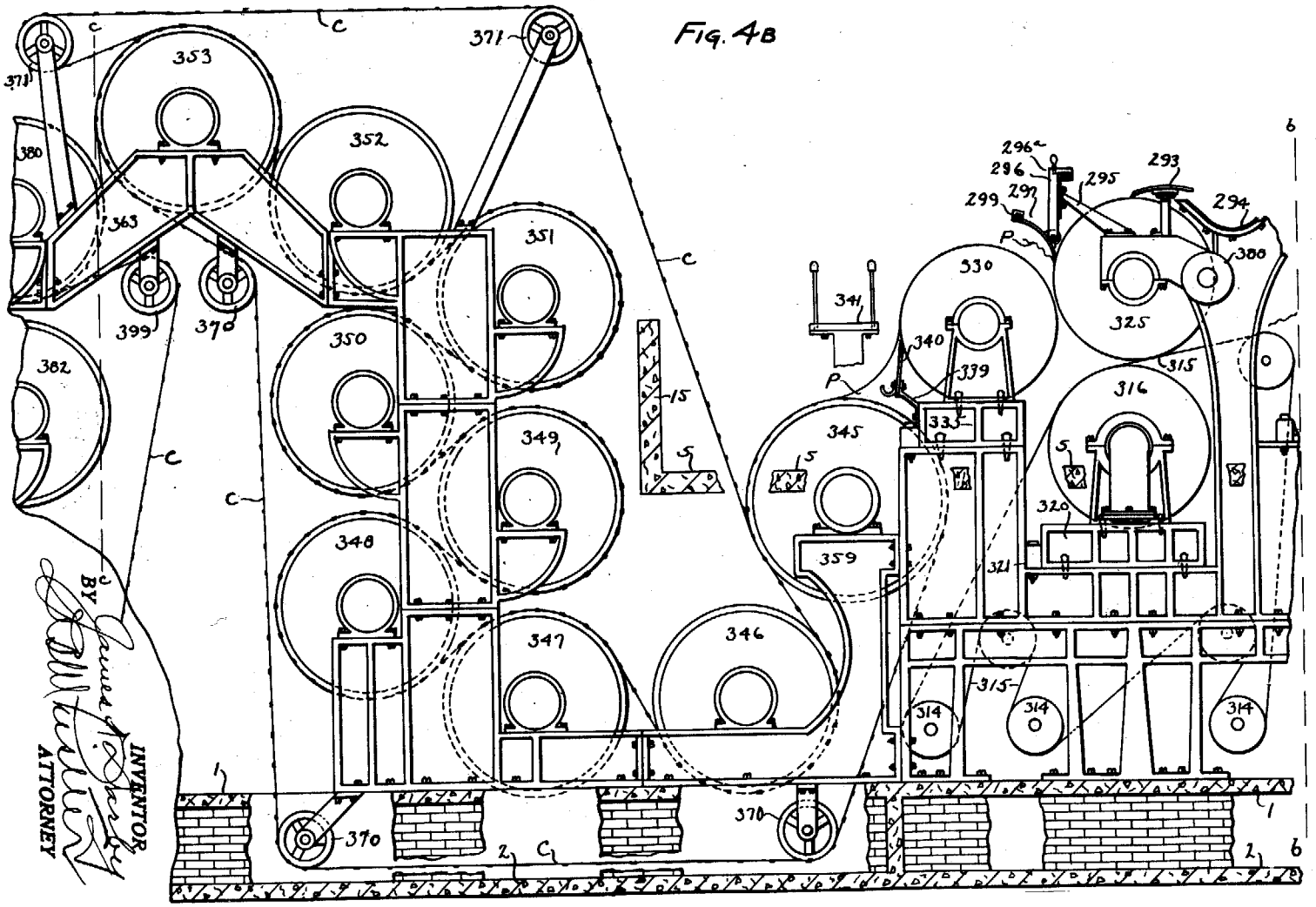

Sept. 3, 1935. J. K. DARBY Re. 19,686
PLANT AND APPARATUS FOR MAKING PAPER
Original Filed Sept. 24, 1928 16 Sheets-Sheet 5
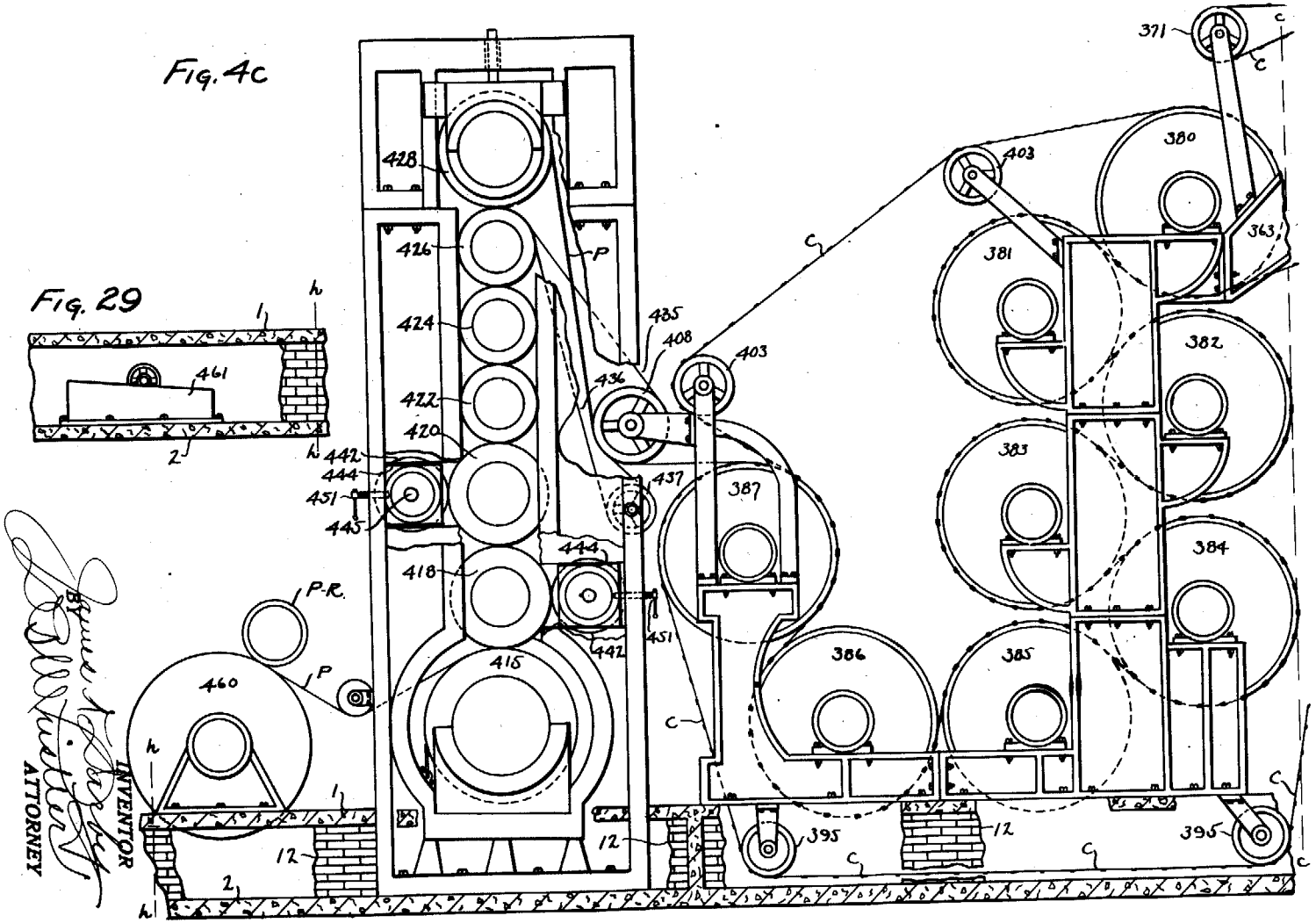

Sept. 3, 1935. J. K. DARBY Re. 19,686

PLANT AND APPARATUS FOR MAKING PAPER

Original Filed Sept. 24, 1928 16 Sheets-Sheet 6

INVENTOR
James K. Darby
BY
L. B. Whistler
ATTORNEY

PLANT AND APPARATUS FOR MAKING PAPER

Original Filed Sept. 24, 1928 16 Sheets-Sheet 7

INVENTOR
James K. Darby
BY
D. M. Tisdale
ATTORNEY

PLANT AND APPARATUS FOR MAKING PAPER

Original Filed Sept. 24, 1928 16 Sheets-Sheet 8

INVENTOR

BY James K. Darby

Wm. Wiseell

ATTORNEY

PLANT AND APPARATUS FOR MAKING PAPER

Original Filed Sept. 24, 1928 16 Sheets-Sheet 9

INVENTOR

James K. Darby

BY

L. D. Whittemore

ATTORNEY

PLANT AND APPARATUS FOR MAKING PAPER

Original Filed Sept. 24, 1928 16 Sheets-Sheet 10

INVENTOR
James K. Darby
BY
ATTORNEY

Sept. 3, 1935. J. K. DARBY Re. 19,686

PLANT AND APPARATUS FOR MAKING PAPER

Original Filed Sept. 24, 1928 16 Sheets-Sheet 11

INVENTOR

BY James K. Darby

ATTORNEY

PLANT AND APPARATUS FOR MAKING PAPER

Original Filed Sept. 24, 1928 16 Sheets-Sheet 12

INVENTOR
James K. Darby
BY
D. Allen Weller
ATTORNEY

Sept. 3, 1935. J. K. DARBY Re. 19,686
PLANT AND APPARATUS FOR MAKING PAPER
Original Filed Sept. 24, 1928 16 Sheets-Sheet 13
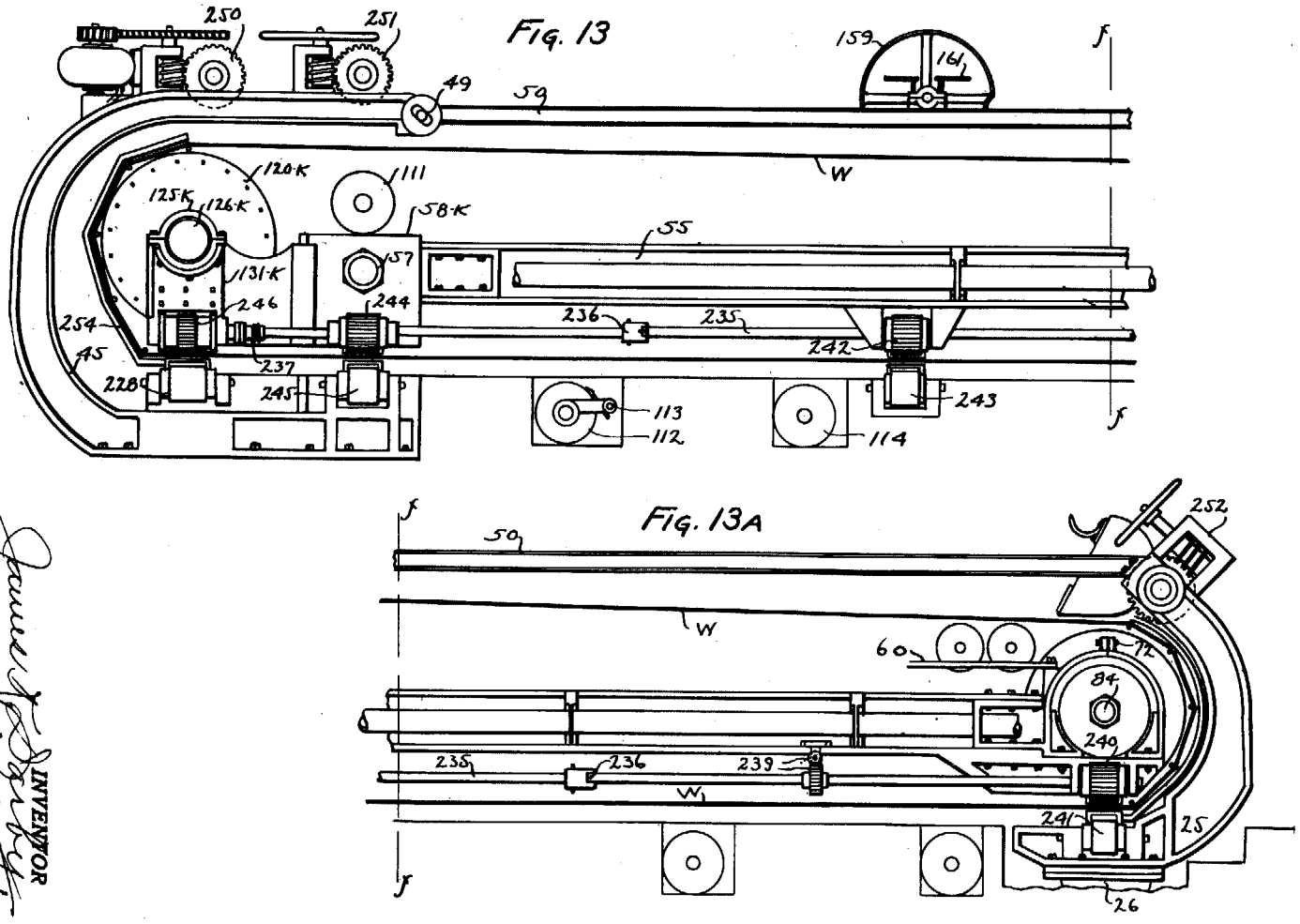
INVENTOR
BY
ATTORNEY PLANT AND APPARATUS FOR MAKING PAPER
Original Filed Sept. 24, 1928 16 Sheets-Sheet 14
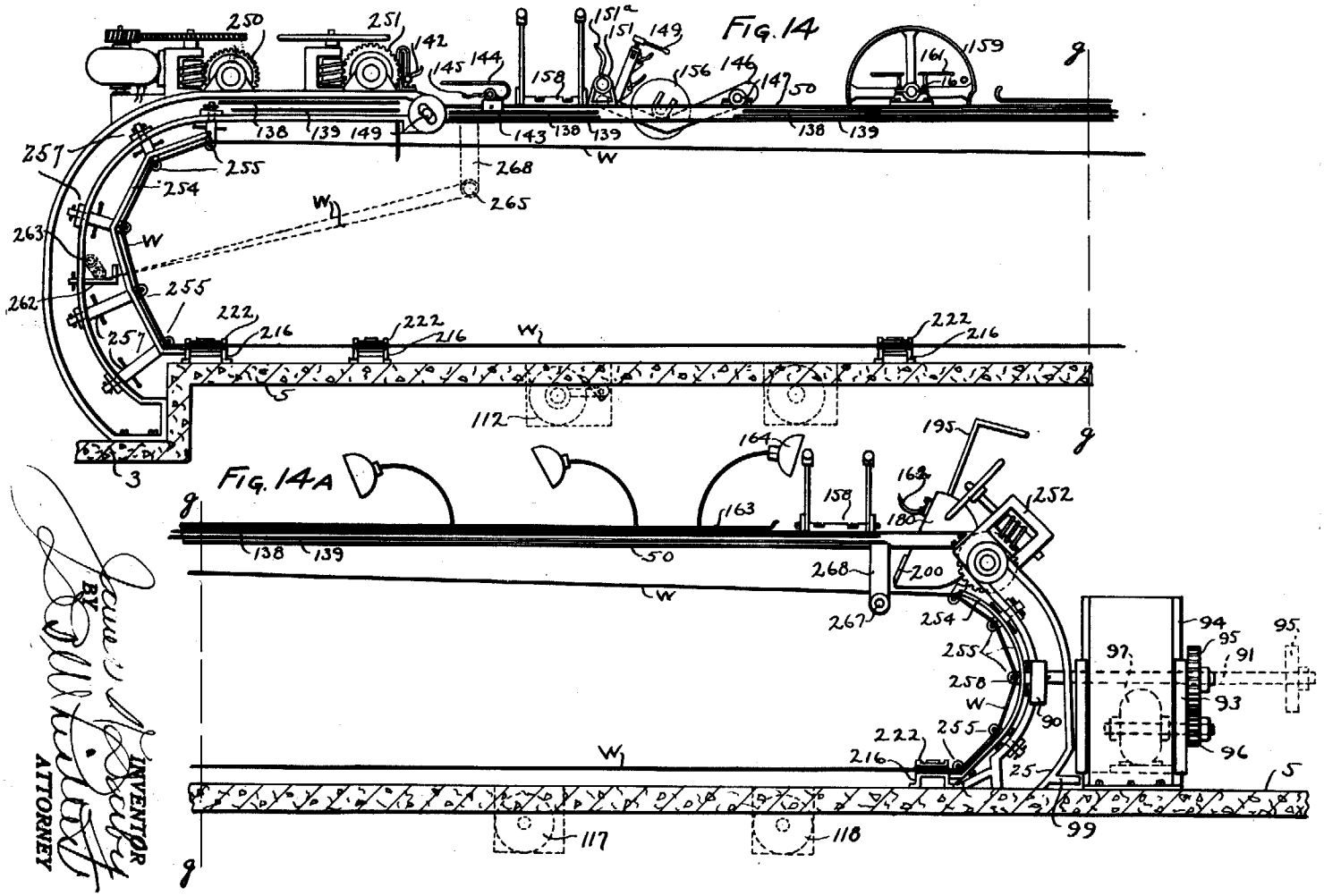
INVENTOR
James K. Darby
BY
ATTORNEY

PLANT AND APPARATUS FOR MAKING PAPER

Original Filed Sept. 24, 1928 16 Sheets-Sheet 15

INVENTOR
James K. Darby
BY
ATTORNEY

PLANT AND APPARATUS FOR MAKING PAPER

Original Filed Sept. 24, 1928 16 Sheets-Sheet 16

INVENTOR

James K. Darby

BY

ATTORNEY

Reissued Sept. 3, 1935 Re. 19,686

UNITED STATES PATENT OFFICE 19,686

PLANT AND APPARATUS FOR MAKING PAPER

James K. Darby, Dayton, Ohio, assignor to Beloit Iron Works, Beloit, Wis., a corporation of Wisconsin Original No. 1,939,337, dated December 12, 1933, Serial No. 307,966, September 24, 1928. Application for reissue February 23, 1935, Serial No. 7,931

92 Claims. (Cl. 92—44)

This invention relates to improvements in plants and apparatus for making paper.

An object attained by my invention consists in space saving features of the plant layout, the resulting lowering of plant investment, reduced maintenance and general overhead, and savings in time and labor production costs.

A further object attained in the invention consists in an improved arrangement for servicing the apparatus, having particular reference to replacing the paper forming wire on the Fourdrinier machine, and space saving features of a filter system and stock circulating system.

An object attained in the invention consists in novel construction and arrangement of the apparatus as a whole which provides for producing a substantially wider sheet of paper at relatively higher speed of operation, with resulting increased output and at lower cost.

The apparatus as a whole is arranged for reducing the human factor in its operation, the conditions of operation requiring supervision being reduced in the process of manufacturing to the minimum.

More specific features of the improved apparatus consist in:

Lowering the couch assembly of the Fourdrinier machine and the general structure of the apparatus as a whole;

Supporting the couch roll assembly of the machine on inclined ways shortening the distance between the couch roll and the breast roll of the Fourdrinier machine to give slack to the paper forming wire for replacing the same;

Constructing a side alcove adjacent the Fourdrinier machine for replacing the wire, and for effecting a substantial reduction in space for housing and operating the apparatus, the improved arrangement resulting in reducing the front side aisle to a mere fraction of the width of the machine;

Arranging the alcove on the rear side of the machine and the means coordinated with the alcove for replacing the forming wire, so that twin units of the Fourdrinier machine can be installed and coordinated in operation for effecting further substantial saving of space in the plant layout;

Means for supporting the full width of the Fourdrinier wire incidental to placing it on the machine;

Means for replacing the Fourdrinier wire without telescoping any part of the machine structure or displacing any longitudinally extended parts within the wire loop;

An improved arrangement of the smooth rolls and felt of the wet press for maintaining normal relation of the felt to the paper;

Means for supporting the paper web from edge to edge for threading the same on the dryers;

Means for threading the paper from the dryers to the calendars at the normal speed of the paper;

Means associated with the calendars for giving light weight, low grade paper, a relatively high finish at lower cost;

Means for giving a relatively high finish to high grade paper without reducing the thickness of the paper;

A super-pressure hydraulic stock circulating system including a stock tank supported independently of the Fourdrinier machine, and a sealed nozzle for delivering the stock to the paper forming wire;

A series of auxiliary lifts for supporting and protecting the paper forming wire across its entire width as the wire is moved transversely to the machine, or the machine is moved to the wire;

Means for providing a relatively greater amount of slack in the forming wire for replacing the same without telescoping any portions of the Fourdrinier machine;

General arrangement of the Fourdrinier machine for minimizing the structural parts requiring removal for replacing the forming wire;

Construction and general arrangement of the Fourdrinier machine as a whole to obtain the advantages of the "telescopic type" of paper making machine for replacing the forming wire, without employing the telescopic principle of construction;

Means for supporting the breast end of the Fourdrinier machine at variable elevations for inclining the forming wire according to the character of the paper stock and the conditions of operation;

And general arrangement of the several sections of the paper making apparatus, Fourdrinier machine, wet presses, dryers, calendars, and reels at different floor elevations for utilizing in relatively higher degree the gravity movement of the paper through the successive stages of formation.

Figure 4:
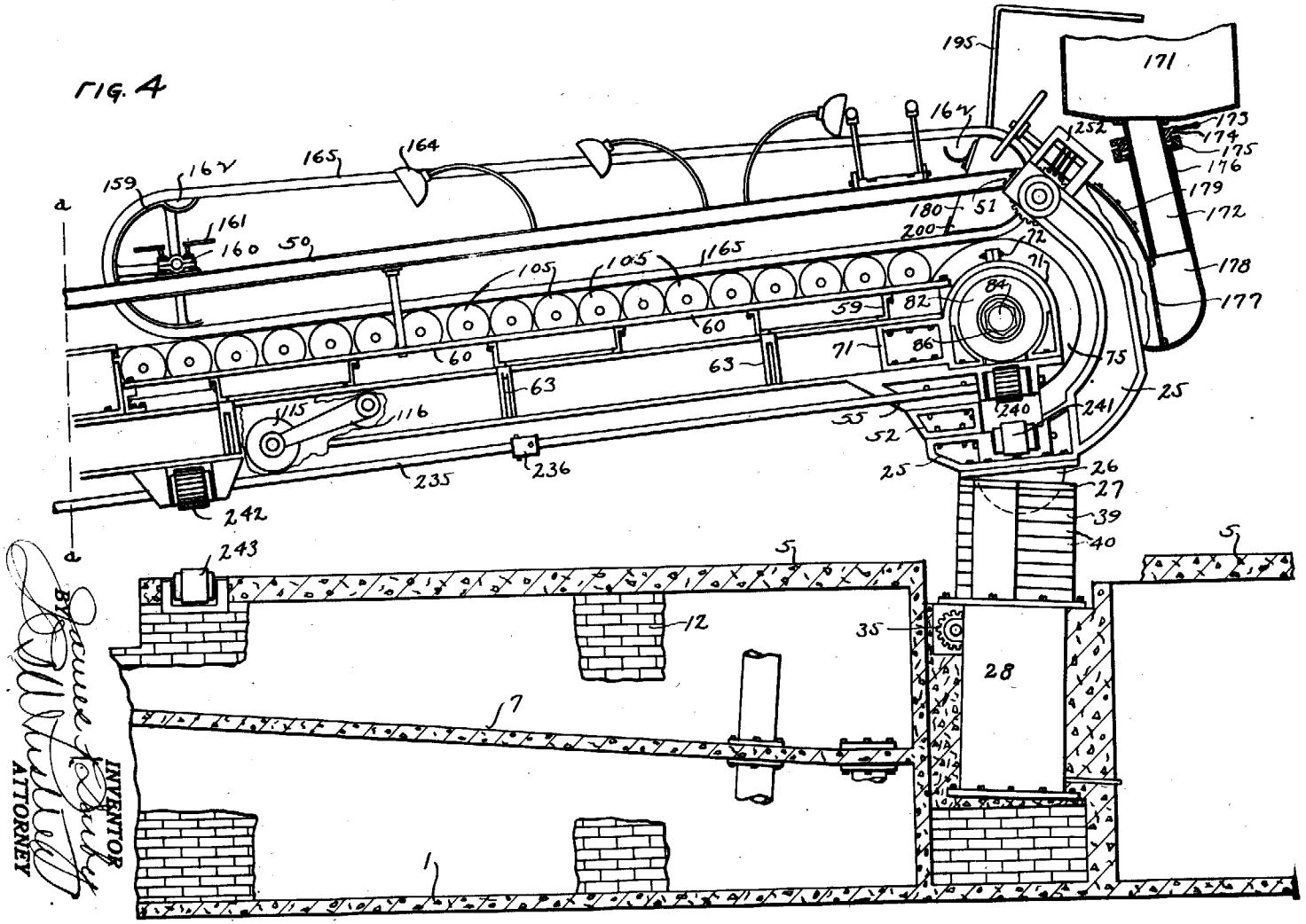

Figures 4–4C inclusive are detail views in side elevation of the paper making apparatus;

Figure 4 being the breast end of the Fourdrinier machine;

Figure 4—A the couch end of the Fourdrinier machine including the first press section;

Figure 4—B the second press section including the first dryer section;

Figure 4—C the second dryer section including the calendars and reels, the division lines between the different figures being indicated respectively at *a—a*, *b—b* and *c—c;*

Figure 5:
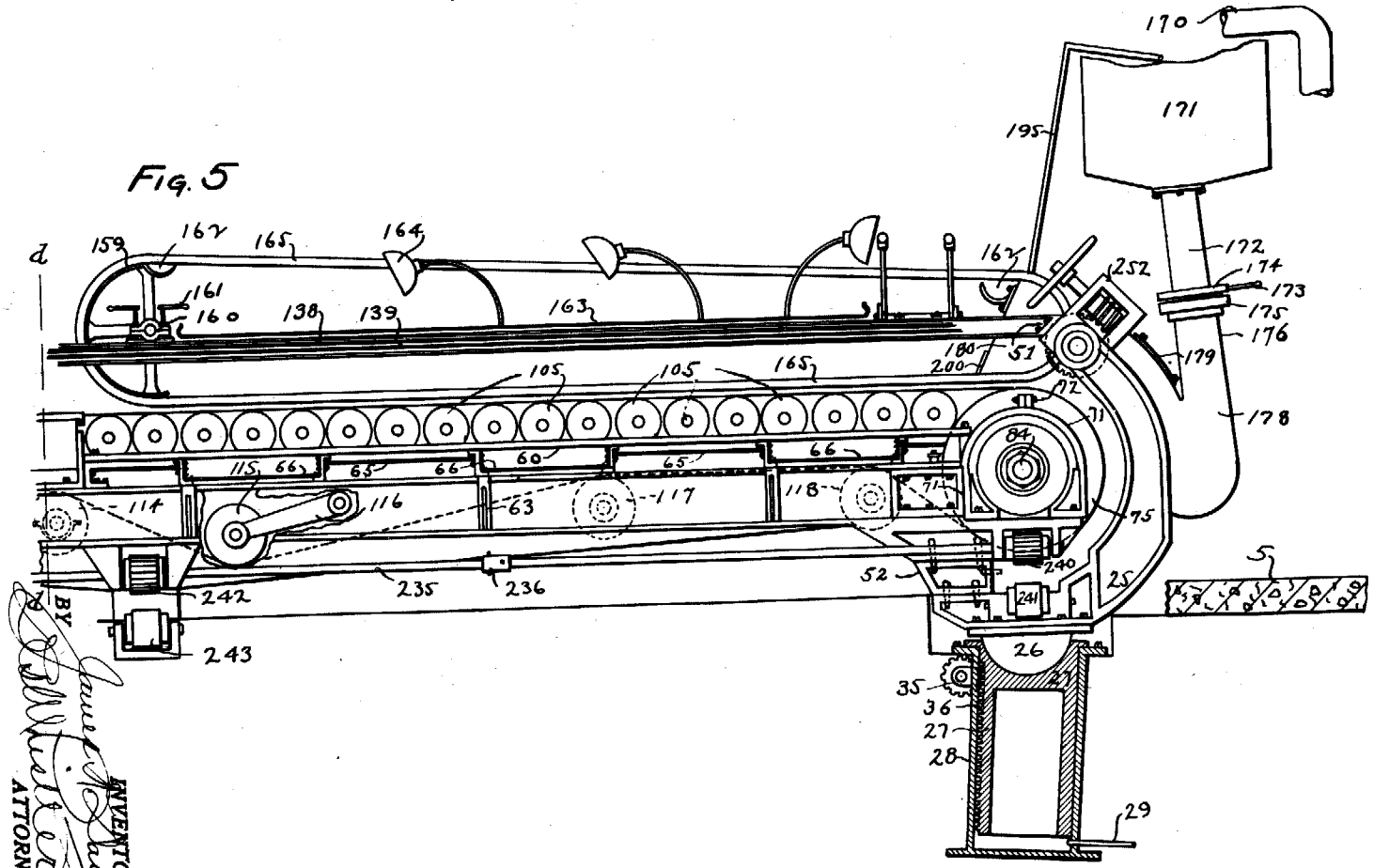
Figure 5A:
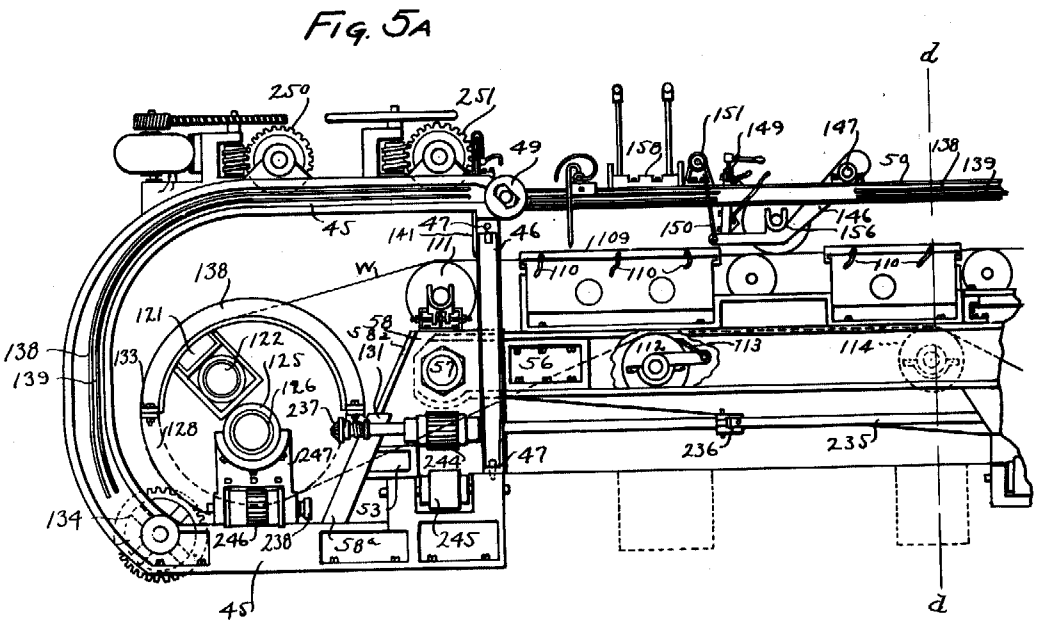

Figures 5–5A are views in side elevation of the Fourdrinier machine showing the breast end of the machine in position for level forming table, and including the super-pressure, sealed nozzle and stock circulating tank, the line of division between the figures being indicated at *d—d;*

Figure 6:
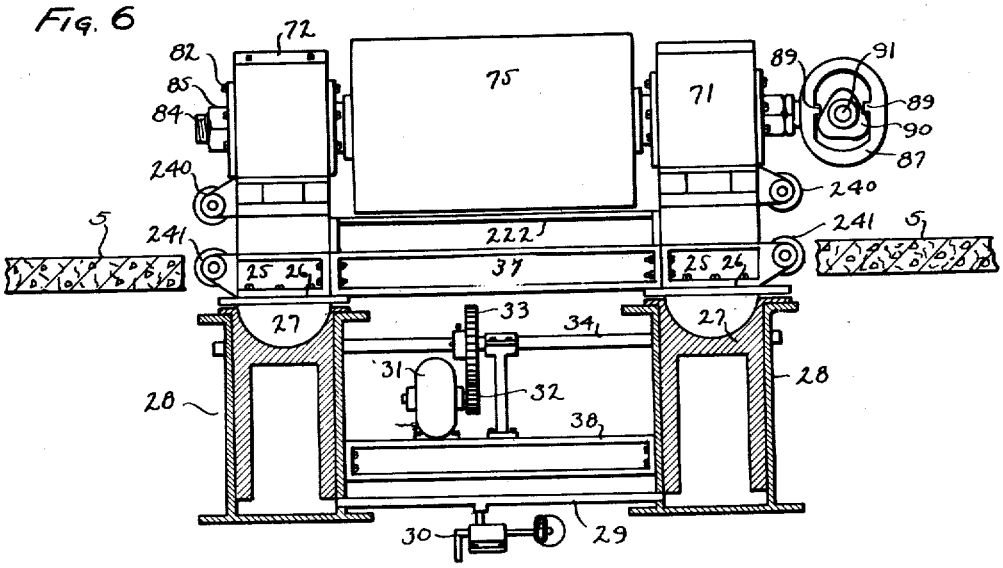
Figure 7:
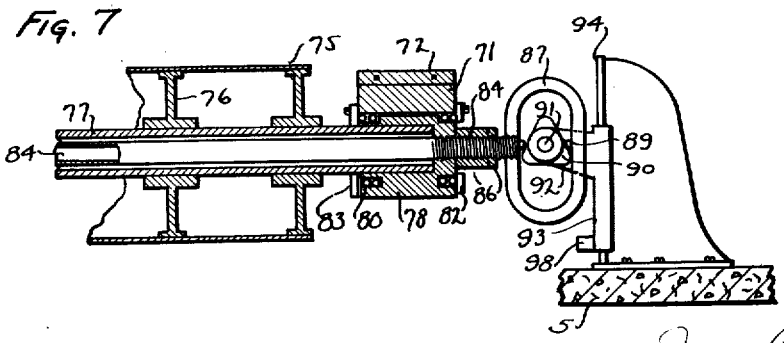
Figure 8:
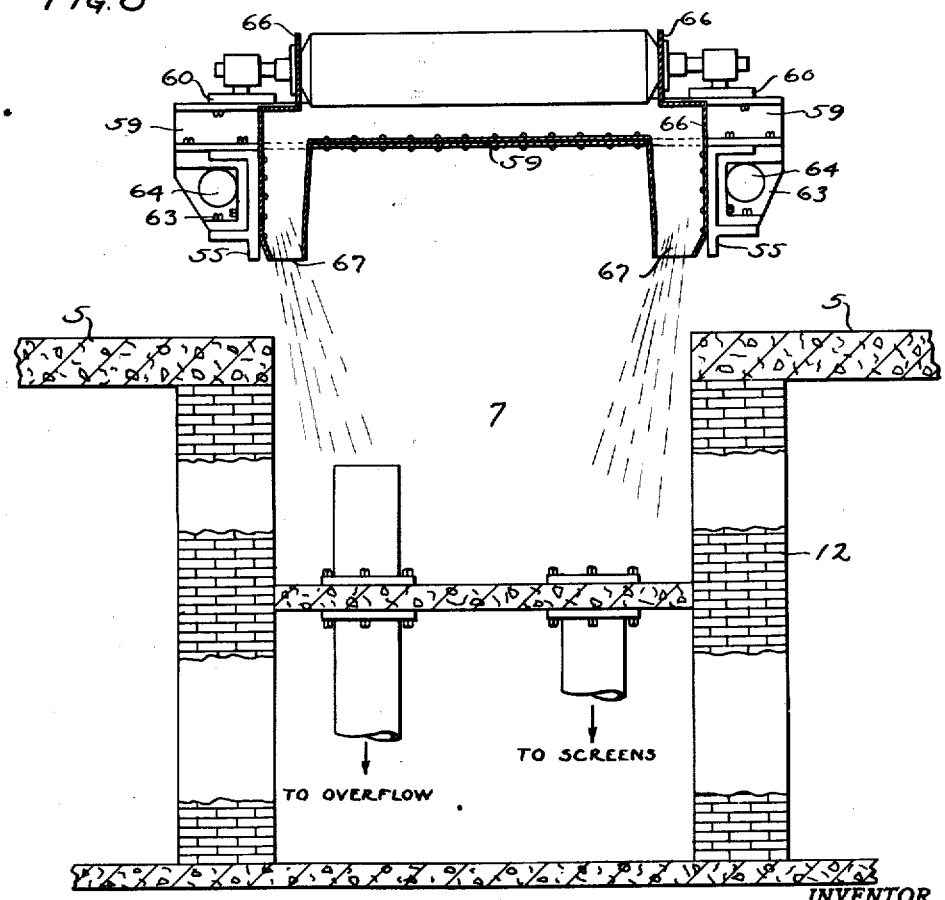
Figure 9:
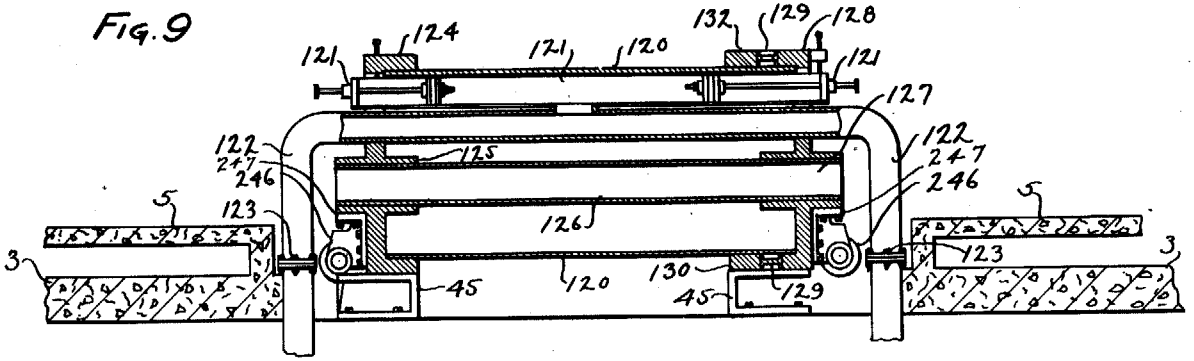
Figure 11:
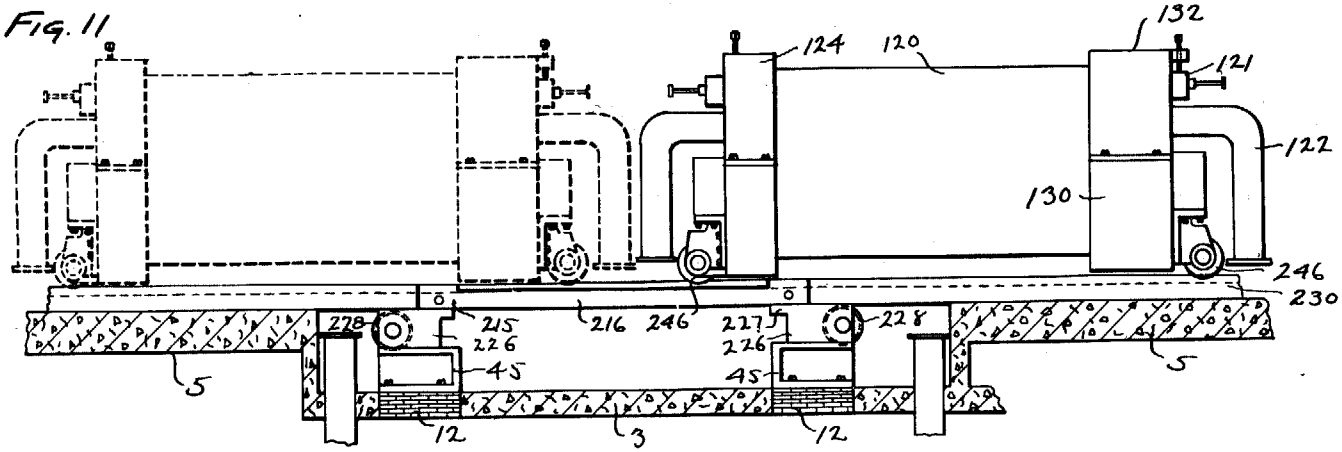
Figure 10:
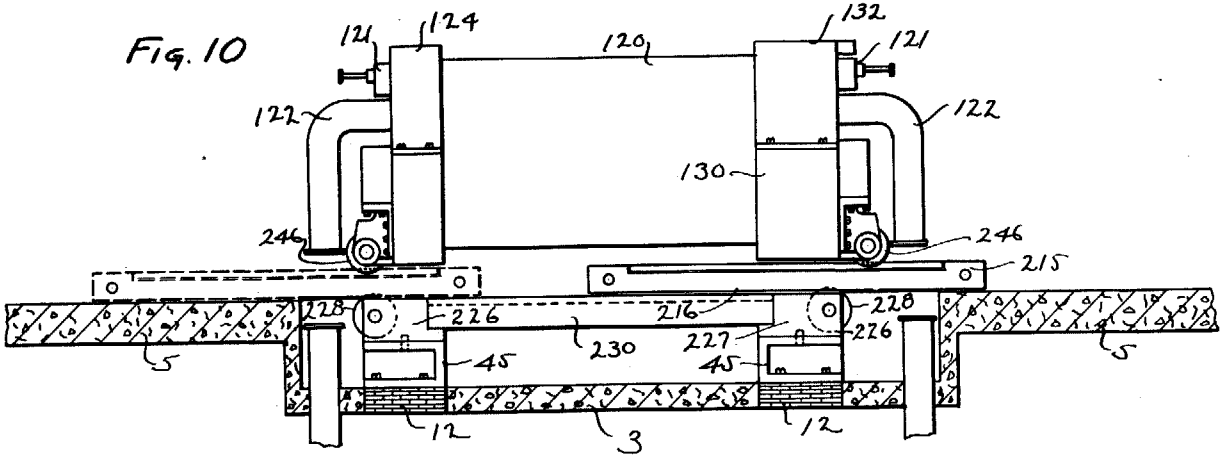
Figure 12:
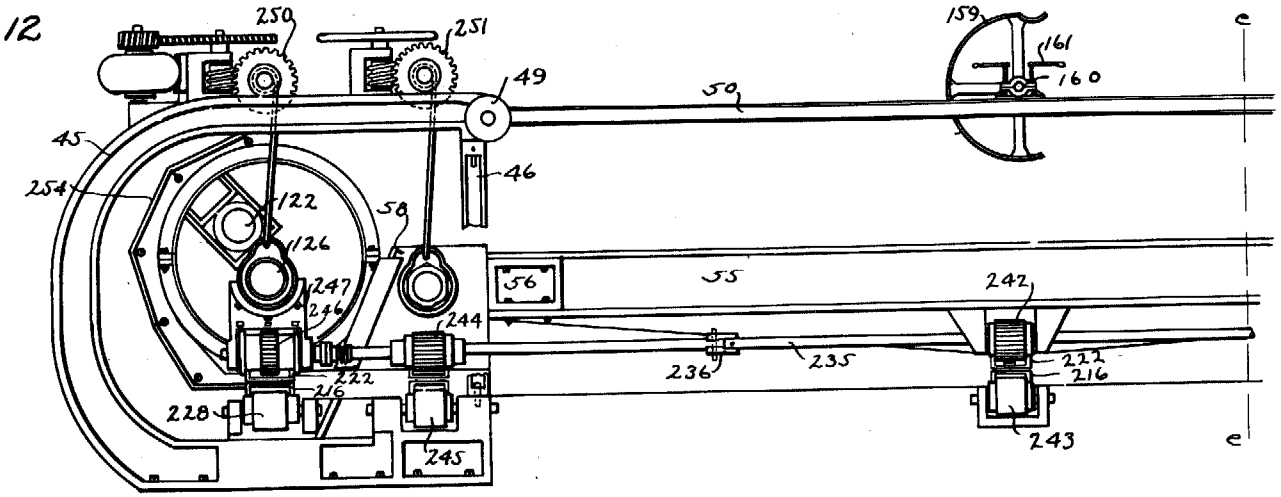
Figure 12A:
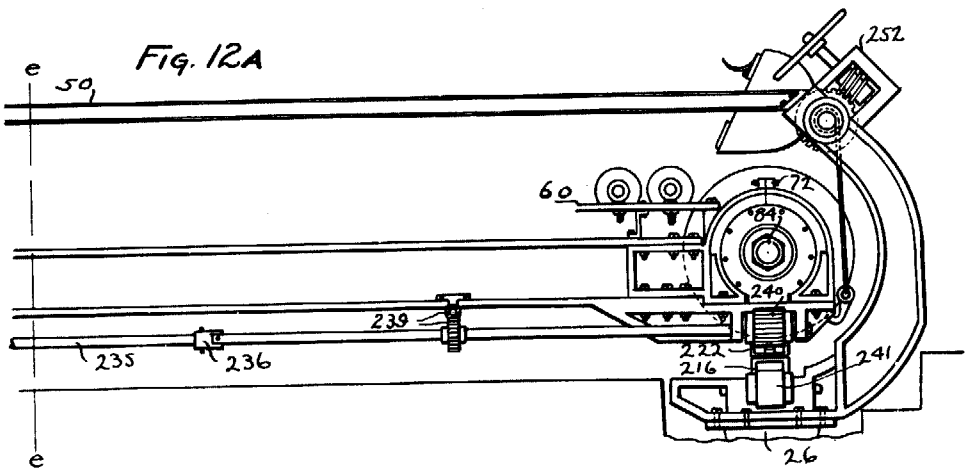
Figure 17:
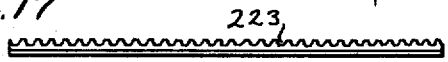

Figure 6 is a view in elevation of the breast end of the Fourdrinier machine as shown in Fig. 5, part of the structure being shown in section;

Figure 7 is a detail view of the breast roll assembly including the shake stand partly in section;

Figure 8 is a view in cross-section of the filter system;

Figure 9 is a view in longitudinal section of the suction couch roll assembly in one form;

Figure 10 is an end view of the couch roll assembly supported upon auxiliary lifts for replacing the paper forming wire transversely;

Figure 11 is an end view of the couch roll assembly supported for moving the Fourdrinier machine laterally to either side for replacing the forming wire;

Figures 12–12A are views in side elevation of the couch roll assembly and breast end assembly, showing hoists for raising the structure for replacing the forming wire, the division between the figures being indicated by lines *e—e;*

Figures 13–13A are views in side elevation of a couch roll assembly of modified construction, and the breast end of the machine showing arrangement of the wire stringing means, the division between the figures being indicated by lines *f—f;*

Figures 14–14A are views of the couch and breast ends of the machine showing the machine cleared and the wire stringing means in relative position for replacing the wire, the division between the figures being indicated by lines *g—g;*

Figure 27:
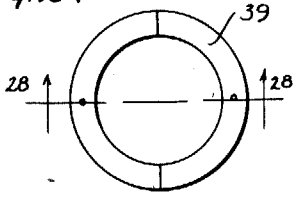
Figure 28:
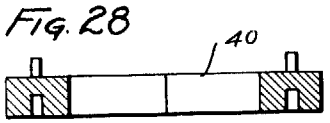
Figure 22:
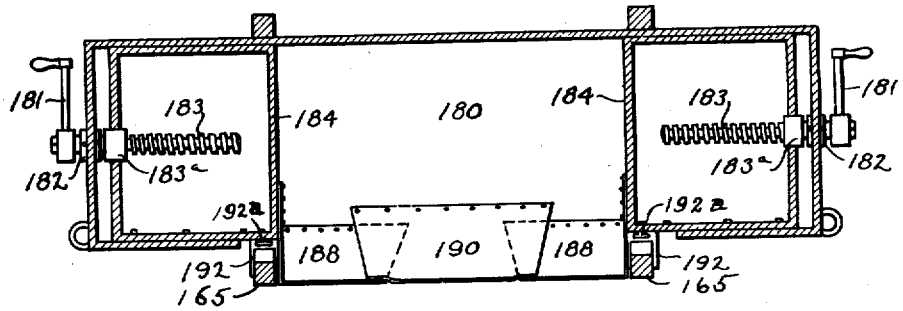
Figure 26:
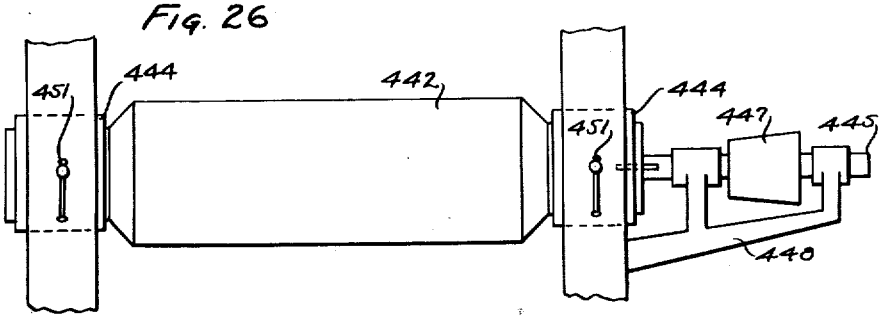
Figure 15:
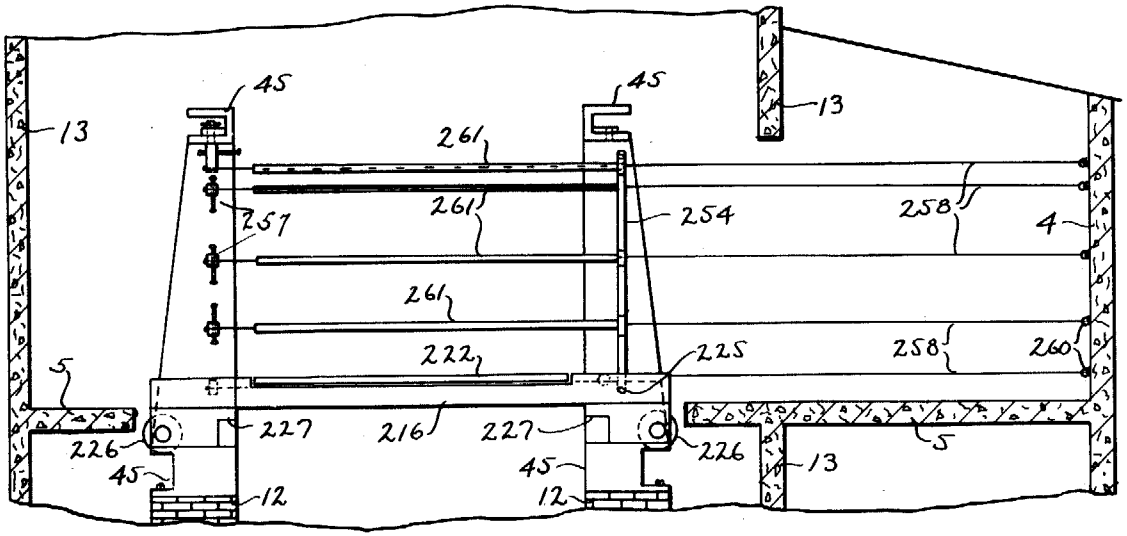
Figure 20:
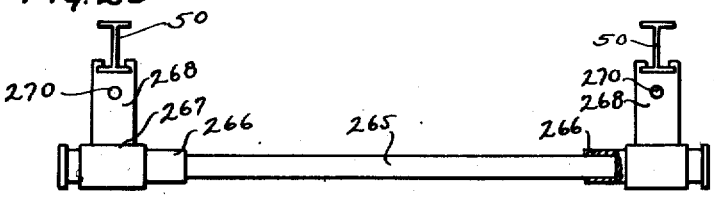
Figure 24:
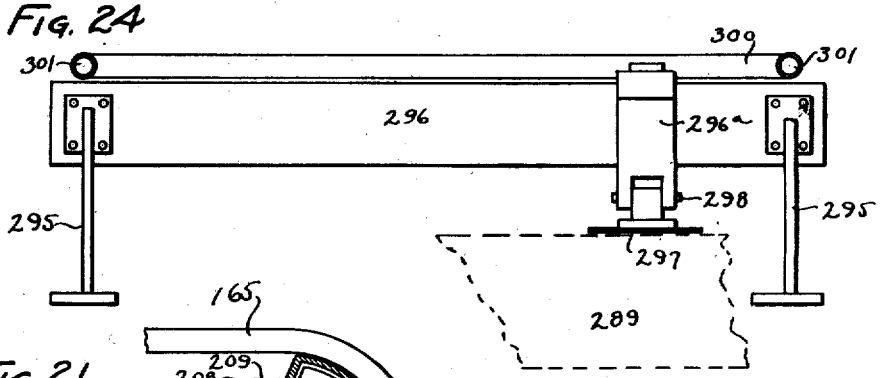
Figure 21:
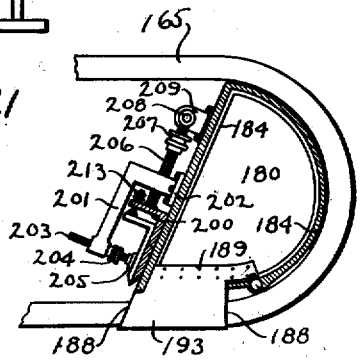
Figure 25:
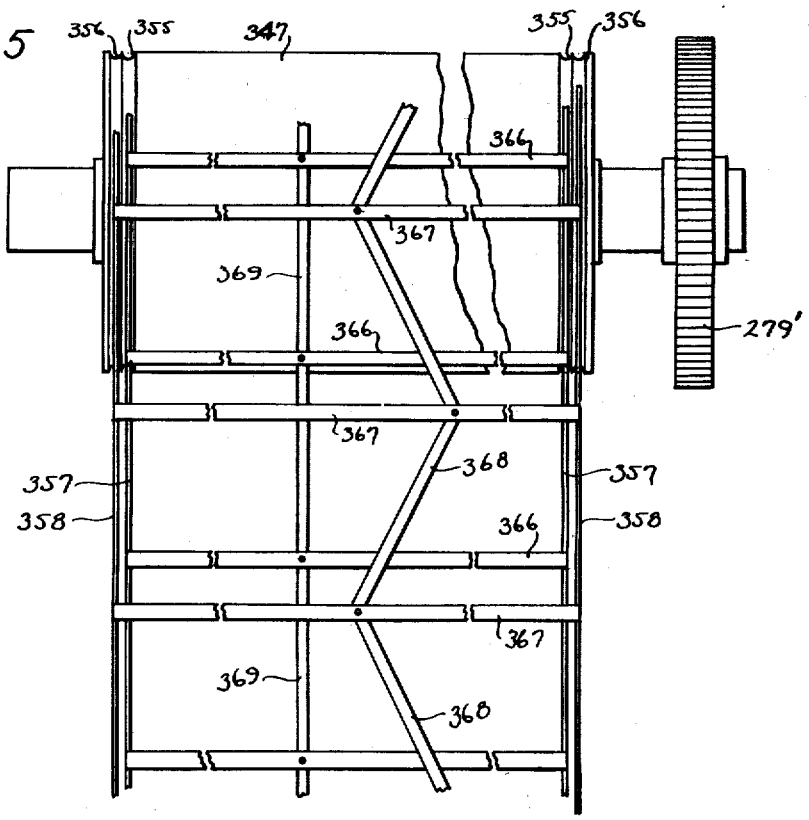
Figure 23:
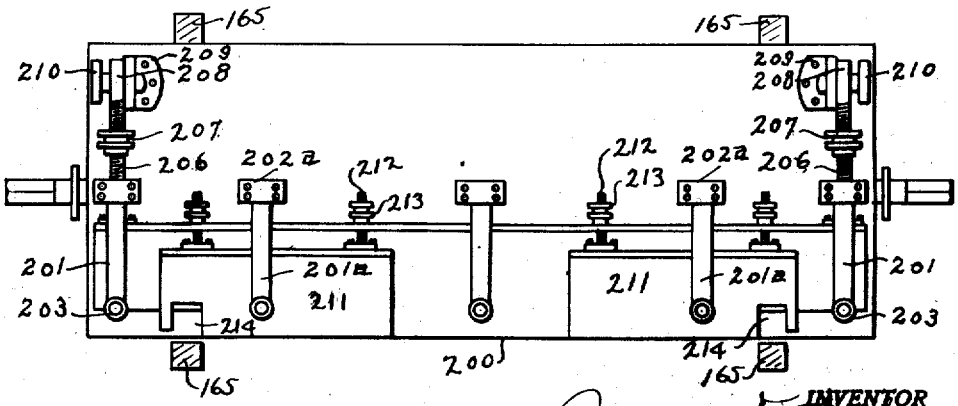

Figure 15 is a view in elevation of the wire stringing means at the couch end of the machine;

Figures 16–19 inclusive are detail views of the auxiliary lifts used in replacing the forming wire;

Figure 20 is a detail view of the wire stringing means;

Figure 21 is a sectional view of the super-pressure nozzle for delivering the paper stock to the forming wire;

Figure 22 is a longitudinal sectional view of the nozzle shown in Fig. 21;

Figure 23 is a view in front elevation of the nozzle showing the arrangement of the slices for sealing the nozzle;

Figure 24 is a detail view of a blade and operating mechanism for skinning broke stock off the top press roll;

Figure 25 is a detail plan view of the carriers for threading the paper on the dryers;

Figure 26 is a detail view of the calendar friction roll drive;

Figures 27–28 are detail views of the blocks for supporting the breast end of the Fourdrinier machine at variable elevations;

Figure 29 is a detail view of the broke beater.

The making of paper being a continuous process, a paper mill operating as a rule twenty-four hours a day, conditions that prolong interruptions of operation, such as present methods of replacing the Fourdrinier wire, which require dismantling and again erecting of much of the machine structure with greater risk involved of sustaining injury to the wire; methods of threading the wet web of the forming wire as it leaves the Fourdrinier machine and presses, on the dryers, resulting frequently in the web breaking at intermediate points on the dryers, with excessive accumulation of waste paper and prolongation of the time the apparatus is out of production, and conditions whatsoever that interfere with normal operation or reduce the production time of the apparatus, are of primary importance from the viewpoint of output and production costs in making paper.

Also, the present requirements in the plant layout for operating and servicing the paper making apparatus adds heavily to the plant investment, and there is increasing demand in the industry for effecting economies both in the plant layout and in operating costs.

In the present practice of Fourdrinier construction, having particular reference to the telescopic type of machines, it is necessary to provide front side aisle space equal in width to at least the width of the machine for replacing the paper forming wire and for handling breaks of the paper on the dryers. This aisle space may be anywhere from 10 ft. to 40 ft., according to the range in width of Fourdrinier machines.

The greater portion of this front side aisle space for Fourdrinier machines is waste space, except as to the requirement for clearance along the front side of the machine for removing and replacing the wire and for handling breaks in the paper. As the paper making apparatus, Fourdrinier, presses, dryers, calendars, etc., are in a straight line arrangement, the front aisle extends the full length of the apparatus, across or through, as the case may be, of the plant structure. Thousands of feet of floor and head space must thus be provided in the plant layout at heavy increase of plant investment, space that must be heated in season, that adds substantially to the general overhead of plant upkeep, and that is idle space except for the requirements for replacing the forming wire and for handling breaks in the paper.

An object of first importance attained in my invention is the saving of a large portion of the front side aisle space of the paper making apparatus. This is accomplished in part by constructing one or more alcoves, preferably a wing, or wings, of the main plant structure, on the rear side of Fourdrinier machines, to provide the required clearance along the side of the machine for replacing the wire. The length and breadth of the alcoves are substantially equal to the length and breadth of the Fourdrinier machines, the alcoves having, if desired, a relatively low roof line for minimizing head space. By this arrangement the width of the front side aisle can be reduced to a mere fraction of the width of the machine with the resulting saving in floor and head space in the main plant layout.

The arrangement of the alcoves along the rear sides of Fourdrinier machines involves novel structural features and improvements of the per making apparatus and its arrangement as a whole as set forth in the following detailed specification.

In the plant layout, as here shown for illustrating the space saving principle of my invention, 1 represents the main floor elevation. Below the main floor level are pits 2 in which portions of the apparatus are located, the floor elevation on the rear side of the apparatus, opposite the suction couch and wet presses of the Fourdrinier machine being indicated at 3, and the floor elevation of the breast end and midsection Fourdrinier machine at 5.

Figure 1:
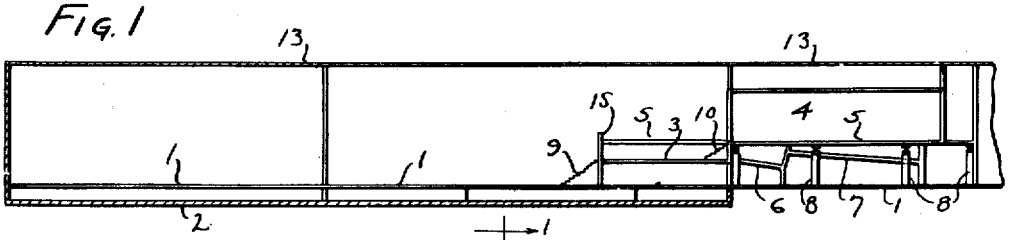
Figure 1 is a view in side elevation of the plant layout, with the outside wall of the plant removed.
Figure 3:
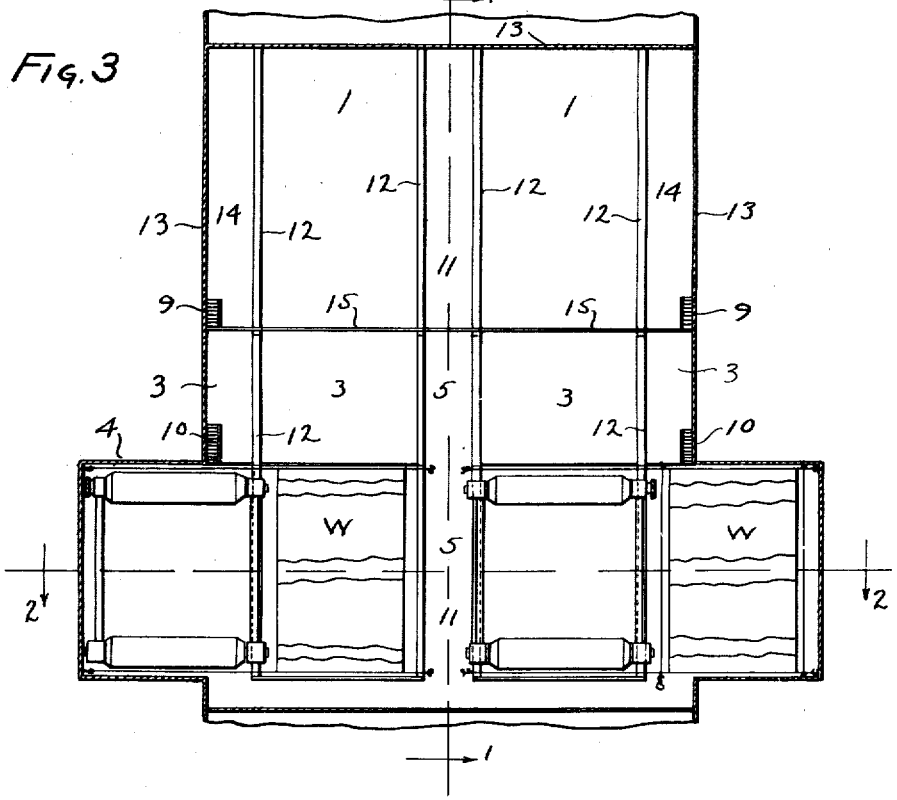
Figure 3 is a plan view on line 3—3 of Fig. 2 showing an arrangement for two paper making apparatus in a space saving layout.
Figure 2:
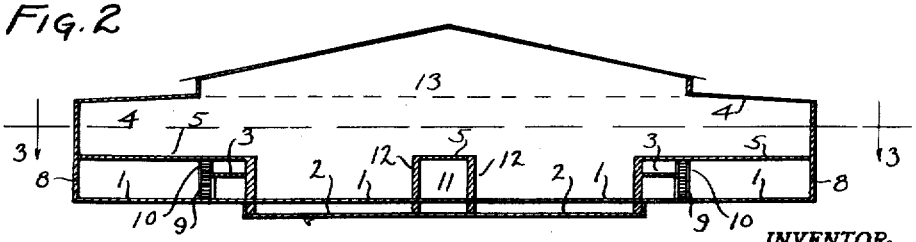
Figure 2 is a sectional view on line 2—2 of Fig. 3.

The alcoves 4 in the plant layout illustrated in Figs. 1–3, are located on the rear sides of the Fourdrinier machines in opposite wings of the plant, the arrangement as here shown being for two paper making apparatus installed and operated in coordinated relation. The alcove floors 5 are supported on foundations 8.

The saveall below the suction couch is indicated at 6, and the saveall below the forming table at 7, (see also Figs. 4—A and 8) all the filter water being delivered into the latter. This arrangement eliminates the usual troughs in the rear of the machine and is an important factor in saving space.

Steps 9 are placed between floors 1—3 and steps 10 between floors 3—5, on the rear side of the Fourdrinier machine.

The front side aisle of the apparatus on the main floor 1 is indicated at 11, the width of the aisle being here shown as substantially one-third of the width of the Fourdrinier machine.

The Fourdrinier machine is supported on foundations 12 extended longitudinally of the machine, as shown in the plan view of the sills in Fig. 3. The over-all width of the main machine room for both apparatus is indicated by the walls 13. The driving connections for the presses and couch rolls of the Fourdrinier machine are located on the rear sides of the machines (not shown), in the spaces indicated at 14. A banister rail 15 is placed, as here shown, between floors 1—5 as a safeguard between the different elevations, the main aisle being extended below, as well as above, floor 5 from the banister rail forward to the breast end of the Fourdrinier machine as indicated in Figs. 1–2. This double floor level of the front side aisle, which serves as a general thoroughfare through the plant, is a factor of safety which reduces the possibility of accidental damage to the Fourdrinier machine, having particular reference to the delicate paper forming wire, which may be injured by transporting material, etc., through the aisle.

The foregoing description of a representative plant layout here shown embodies the principle of space saving which constitutes one phase of my invention. It will be apparent from the different elevations of the paper making apparatus that the paper in the forming process moves from a higher to a lower level, on the Fourdrinier machine, to the wet press, from the press to the dryers, from the dryers to the calendars, and from the calendars to the reels, the favorable conditions of gravity movement being thus utilized in relatively higher degree which enables speeding up the production apparatus and creates more favorable conditions for handling the product.

It will be apparent from the plant layout, as here shown, that the savings in floor and head space is very substantial, the savings in floor and head space in the Fourdrinier machine room being from thirty percent upward over the present common practice, according to the size and single or plural installation of the paper making apparatus.

The factor of reduced heat radiation resulting from the reduction in head space requiring heating, is a further gain of material consequence in lowered operating costs. The alcoves, as contemplated in the practice of my invention, have a lower roof line, and are of relatively lighter and cheaper construction than the main plant. Accordingly, the alcove space, which in the present practice of plant layout is all in the front side aisle space, can be provided at relatively lower cost of plant investment.

The improved plant layout and the general arrangement of the paper making apparatus coordinated therewith also makes possible the use of wider apparatus, it being contemplated in the practice of the invention to produce paper in any desired width, the apparatus herein shown and described being a layout for producing paper four hundred inches wide, the apparatus being accordingly heavier and permitting of higher speed operation with resulting increase in the output.

In the drawings, the Fourdrinier machine is shown in side elevation in Figs. 4–4A and 5–5A, certain details of construction common in the art being shown more or less conventionally. It will be noted that the breast roll 75 of the machine, as best shown in Fig. 4, is supported at an elevation which causes the paper forming wire W to be inclined downward from the breast roll to the couch roll 120, in accordance with the Eibel system, for effecting gravity movement of the paper stock with the movement of the wire. This arrangement together with the elevation of the breast end of the Fourdrinier machine at a higher floor level than the couch end and the dryers provides for utilizing in relatively higher degree the gravity movement of the paper over the paper making apparatus, and makes possible operating at higher speed with resulting increase of the output.

The breast housing 25, as best shown in Figs. 4–5–6, has bolted to it the male members of ball and socket joints 26—27, the latter being parts of opposite hydraulic jacks 28 upon which the breast end of the machine is normally supported at variable elevations. The mechanism for operating the jacks consists in a water supply pipe 29, pump 30 operated by a motor 31, and connected to the jacks by gears 32—33 and a shaft 34. Gears 35 on shaft 34 operate racks 36 which have secured to their upper ends the lower members of the joints 26—27.

The opposite sides of the breast housing are connected one with the other by a cross frame member 37, the opposite jacks being joined together and braced laterally by a frame member 38.

The jacks 28 serve for raising the breast end of the machine to any desired elevation, within the limits of practical operation, for determining the inclination of the paper forming wire, as may best suit the nature of the paper stock and the conditions of operation. It will be apparent that the ball and socket relation between parts 26—27 will compensate for the angular movement of the breast end of the machine as it is elevated by means of the hydraulic jacks, thus relieving the structure of stresses which would otherwise occur. The lifting jacks as shown are set at a suitable angle to compensate for the changes in the weight center on the jacks as the machine is raised.

Upon raising the breast end of the machine to the desired elevation, as illustrated in Fig. 4, the structure is supported on opposite sides upon splits blocks 39—40, the blocks being arranged in superposed relation for building up the support for the machine, the blocks supporting the opposite sides of the machine at level elevation to effect accuracy of its operating alignment.

Connected to the opposite sides of the couch housing 45, at the opposite end of the machine, as shown in Figs. 4—A and 5—A, are vertical supports 46 secured by dowelings 47, and connected by compensating slotted joints 49 to opposite rails 50 extended from the breast end to the couch end of the machine, the rails being connected at the breast end at 51. Removable blocks 52 at the breast end and 53 at the couch end support the parts of the machine within the wire loop.

The structural parts within and in the adjacent lateral planes of the wire loop, consist in opposite truss rails 55 which extend from the blocks 52 to blocks 53, yoke bearings 56 being secured to the opposite rails 55 and supported at 57 on the table housing 58 which in turn rests on blocks 53. The rails 55 are cross-braced, as best shown in Fig. 8, by rails 59, which project laterally outwardly of rails 55, the projecting ends being supported by brackets 63 for preventing torsional displacement of rails 55. The table rails 60 are bolted to the cross rails 59 and extend parallel with rails 55.

Provision is made on bracket 63, as indicated at 64, for supporting on the machine as here shown (see Fig. 8), the self-contained water system which is an important feature of the improved structure, being a development of the inventions set forth in my patents Reissue No. 16,218, issued December 1, 1925, and No. 1,679,854, issued August 7, 1928.

In the structure shown in my earlier patents, the filter water is retarded by flooding the savealls which discharge into a trough on the rear side of the machine, the savealls being supported upon the shake rails. In the arrangement of the self-contained water system herein set forth, neither the truss rails 55, table rails 60, nor the savealls are included in the shake structure, the bulk and weight of the operable structure being substantially reduced from the usual arrangement. The improved construction of the savealls serves also for preventing backlash of the deckle edges of the paper as the newly formed sheet traverses the forming table, which develops from the shaking action in machines of the usual construction. The arrangement of the shake structure is an outstanding improvement in Fourdrinier construction.

The detail structure of the improved saveall system consists, as best shown in Figs. 5 and 8, in the saveall trays 65 which are connected to and discharge into troughs 66. The sides of the troughs extend upward to the level of the paper forming wire and are bolted to cross rails 59 and rails 55 extending downward to the lower edges of rails 55, and discharging into pit 7 below the forming table. Thus the saveall system is self-contained within the main structure of the Fourdrinier machine and overcomes the less advantageous and generally objectionable locating of the filter troughs, and their connections on the rear side of the machine.

Supported on rails 55 as shown in Figs. 4—5—6—7, are the breast roll yoke housings 71, which are split at 72 and bolted to the rails. The breast roll 75 is supported on spiders 76 secured to a hollow shaft 77 which is journaled at its opposite ends in bearings 78 mounted loosely in the yoke housing 71, the bearings being slidable transversely of the machine on rails 55 for producing the shake movement. Springs 80 on opposite sides of bearings 78 serve for compensating for the end thrust in the breast roll journals in the shake action, the springs being retained in the bearing by plates 82—83 secured to housing 71.

Extending through the breast roll shaft 77 is a tie shaft 84 having its opposite ends secured in bearings 78, nuts 86 threaded on the ends of the shaft acting to hold the shaft rigid between the bearings. Secured to one end only of shaft 84 is a yoke 87 provided with bosses 89 coacting with a cam 90 to impart an axial shaking action to the breast roll. The shape of cam 90 is such, as shown in Fig. 6, that a rapid triple shaking action in addition to a long, relatively slow, overall stroke is given to the breast roll upon each rotation of the cam, with corresponding effect on the paper stock on the forming wire.

Cam 90, as best shown in Figs. 7—14A, is secured to an operating shaft 91 supported in bearings 92 on vertically adjustable bearing bases 93, which are slidable on base housing 94 supported on floor 5. A gear 95 on shaft 91 meshes with a gear 96 driven by a motor 97 which is mounted on one side of the sliding bases 93. A boss 98 on block 93 coacts with a boss 99 on the breast housing 25 for effecting the vertical adjustment of the breast roll shaking apparatus.

As best shown in Fig. 14—A, the cam shaft 91 has a relatively long extension for disconnecting the shaft and moving it endwise for replacing the paper forming wire.

The table rolls 105 are supported on rails 60 in the usual manner.

The suction boxes 108—109 are supported on angle plates 107 secured to rails 55 in the relation shown in my Patent No. 1,679,864 herein referred to.

A water line connection 110 for the suction boxes is shown more or less conventionally, being substantially the same in arrangement as shown in the structure set forth in the aforesaid patent.

A guide roll 111 for the paper forming wire is supported on the couch table housing 58, as shown in Figs. 4—A and 5—A. A wire carrying roll 112 is provided with a doctor blade 113 which acts to prevent fiber, carried on the wire, from the forming table and accumulating on roll 112 and injuring the wire, the doctor board being self-contained in the carrier roll assembly for convenient removal of the parts as a unit for replacing the wire.

Wire carrying rolls 114, 117 and 118, and a roll 115 are provided in the lower draw of the wire, the rolls being supported on the opposite rails 55, roll 115 being supported on pivoted arms 116 and acting to stretch the wire.

In Figs. 4—A, 5—A and 12—A, a construction is shown which is known in the commercial art as the Millspaugh suction couch roll. The general arrangement of this structure, well known in the art, presents peculiar difficulties, for replacing the paper forming wire. An object attained in my invention consists in a modified arrangement of this structure for replacing the wire with less difficulty. The base of the couch housing 45, as shown, is well below the main Fourdrinier floor 5, the couch suction roll 120 being supported in a pit, the forming wire from guide roll 111 to couch roll and from couch roll to the first carrier roll 112 being disposed at acute angles, thus causing a greater bite of the couch roll on the wire for driving it which, in the degree attained by the arrangement shown, is a desirable condition of operation, more especially in Fourdrinier machines of large capacity. In a machine having capacity for producing paper four hundred inches wide, the couch roll should be approximately four feet in diameter. Thus, the elevation of the forming table, in a machine of large capacity of the usual construction, would be above the line of view of the operator on the main floor, which would be an impracticable condition of operation. Lowering of the couch roll below the main floor level of the machine lowers the elevation of the forming table accordingly, provides for additional slack in the wire for replacing it, and overcomes the otherwise impracticable conditions of operation.

In Figs. 4—A and 9 are shown the suction couch roll 120, suction box 121, suction pipes 122. The end bearings 124—128 of the couch roll are jointed together by a cross tie shaft 126, the ends of the shaft extending through the bearing hubs 125. The couch roll drive gear 129 is mounted between bearings 128 and a split bearing 130 at one end of the roll. The couch roll supporting structure is connected to opposite bases 131 which are slidable on inclined ways 58*a* of the couch table housing 58.

The driving connections to gear 129 consist in a gear 134 (see Fig. 5—A) of the drive connection 97—96—95 on the rear side of the machine, the connection to the drive (not shown) being made in any suitable manner.

The base construction of the couch roll consists in the couch housing 45, blocks 53, table couch housing 58 and the sliding bases 131 tied together in an integral assembly. As the couch roll is raised for replacing the forming wire, the bases 131 slide on the ways 58*a*, thus shortening the distance between the couch roll and breast roll and giving added slack to the wire for clearing the enlarged end bearings 124—132 of the couch roll.

A modification of couch roll construction is shown in Fig. 13, which is known commercially as the Killberry couch roll. As here shown, the couch roll 120K is supported on journals 125—K—126—K, the roll being driven by gears on the opposite side of the machine (not shown). The essential difference in the two forms of couch roll constructions shown consists in the journals for supporting the couch rolls. In the construction shown in Fig. 9, the journals are larger in diameter than the diameter of the roll and, accordingly, require the added slack in the forming wire for clearing the journals when the wire is replaced, provided by the inclined ways 58*a* and the sliding bases 131 for raising the couch assembly. In the construction shown in Fig. 13, the couch roll journals are smaller in diameter than the roll, thus the added slack in the wire is not required. Accordingly, no provision is made for shortening the distance between the breast and couch rolls for replacing the forming wire. The couch roll 120—K is supported in head bearings 131—K which have slidable movement on vertical bearings 58—K. In other respects the two couch roll assemblies are substantially the same in construction and operation.

The planes of movement of the paper forming wire as herein shown and described, their effect upon the operation of the wire and upon the amount of slack obtainable in the wire for replacing the same, are highly important in the practice of my invention. A more detailed description of these features of the wire and the associated machine structure is as follows:

From the breast roll 75 to guide roll 111, the wire moves in a straight line in an angular plane according to the elevation of the breast end of the machine. From roll 111 to the couch roll 120 the plane of the wire changes to an acute angle downward; from the couch roll, on the bottom draw of the wire, to carrying roll 112 the plane of the wire is at an acute angle upward, the rise of the wire approximating the elevation of the suction boxes. Between carrying rolls 112—114 the plane of the wire is substantially parallel with its adjacent upper course; from roll 114 to roll 115 and from roll 115 to roll 117 the plane of the wire varies with the tension of the wire; from roll 117 to roll 118 the plane of the wire is again substantially parallel with its adjacent upper course, and from roll 118 to the breast roll, the wire inclines at an acute angle downward.

It will be noted that the bottom draw of the paper forming wire as a whole has a pronounced rise above the lower crown faces of the breast and couch rolls, being the opposite in this respect from the common practice in Fourdrinier machine construction in which the bottom draw of the wire is generally lower than the breast and couch rolls. The main advantage of the higher bottom draw of the wire as practiced in my invention consists in the relatively longer wire and the added and more conveniently obtainable slack in the wire for replacing it on the machine.

A further advantage attained in the novel arrangement of the paper forming wire as above described results when the paper breaks at the couch end of the machine. When such breaks occur on machines having the usual arrangement of the paper forming wire, the broken paper adheres more or less to the wire, dragging back with the wire and accumulating on the carrying rolls, thus causing the wire to ridge up over the rolls and ruining the wire. In the arrangement of the wire as herein shown and described, the upward inclination of the return wire from the couch roll is more favorable to the action of the shower of water, which is constantly upon the inner face of the wire and acts to remove in large measure any broke stock adhering to the wire before it reaches the first carrying roll. This feature of keeping the wire relatively clean of broke on the bottom draw of the wire is an important factor in the improved conditions of operation, as it permits of increasing the speed of the machine and acts to prolong the life of the wire.

The downward inclination of the wire at the breast end, as well as at the couch end of the machine, substantially increases the bite of the breast roll on the wire and results in a general betterment in the operating conditions of the wire, tending, more especially, to minimize lateral slipping of the wire on the breast roll incidental to the shake action.

Outside the wire loop, along the upper course of the wire are the rails 50 which effect rigidity in the span from the breast to the couch ends of the machine. Extended longitudinally along the front rail 50, as best shown in Figs. 5—5A, are a water line 138 and a steam line 139. An angle cross brace (not shown) extends from the front to the back side of the couch housing 45 upon which is supported a water jet 141 connected to the water line 138 by a hose 142. Another water jet 144 is connected to the water line by a hose 143, the jet being adjustable transversely of the machine and also angularly to any desired position. The water jets 141 and 144 are cut squirts disposed above the top run of the forming wire. These cut squirts are adapted for cutting the sheet of paper so that it may be more readily picked up and transferred to the press rolls as is well understood in the art.

A dandy stand 146 is secured to rail 50 at 147, being mounted upon a vertically adjustable bearing 149 for adjusting the dandy roll relative to the forming wire. A cable 150 operable on a windlass 151 supported on rail 50 serves for moving the dandy roll out of operable relation with the wire for replacing the wire. The water and steam lines 138—139 and their usual connections may be supported in any suitable manner parallel to the plane of movement of the forming wire for supplying water and steam to the dandy roll, the water and steam lines being oblong in vertical cross section, for stiffening the pipes to prevent sagging between supports. The dandy roll is indicated at 156 in Figure 4—A. The cable 150 is connected with the dandy stand 146 at 155 and the steam and water jets are indicated at 154 and 154' in Figure 4—A. The purpose of the water and steam supplies to the dandy roll is to clean the same and prevent plugging of the meshes of this roll. The water and steam supply is preferably intermittent, although the water supply may be continuous and the steam supply is adapted for use with or separately of the water supply preferably at the end of a paper forming run on the machine.

A foot-board assembly 158 spans rails 50 in a manner which does not require removal of the foot-board for replacing the forming wire on the machine.

The deckle returns 159 are supported in box bearings 160 secured to rails 50, the half section deckle returns being held against turning by lever screws 161. Troughs 162 secured to the deckle returns and to the stock nozzle serve for catching portions of paper stock carried up by the deckles 165, and discharging the accumulation of stock at the side of the machine, thus preventing such material falling back on the wire, which might result in breaks of the paper or injury to the wire.

A conduit 163 for electric light wiring 164 is supported on rails 50, the wiring being self-contained on the machine and arranged generally for effecting a better lighting system.

In Figs. 4, 5, 21, 22 and 23, an improved stock circulating apparatus is shown for delivering the paper stock to the machine, the main object attained in the improvements here shown consisting in a smaller, more compact and more effective structure for delivering the paper stock to the forming wire under super-hydraulic pressure. With the trend to Fourdrinier machines of greater width, the corresponding increase in bulk and capacity of the head box and forebay, in machines of the usual construction, present problems of impracticable structure. The improvements in the apparatus for delivering the paper stock to the machine, as herein set forth, overcome or materially reduce such difficulties. A particular difficulty overcome consists in preventing dead ends in head boxes of large capacity in which the stock material tends to form into lumps which cause, when discharged upon the forming wire, uneven surfaces and breaks in the paper. Mechanical means employed for reducing such lumps before the stock moves to the wire are more or less ineffective, and the condition of lumps forming in the stock and their harmful effect on the paper and the forming wire remain a constant problem under conditions of the present practice.

Fourdrinier machines of maximum capacity under the present practice, 300 inches wide, will produce 45,000 pounds of news print per hour, and will require 64,000 gallons of water per minute for circulating the paper stock to the forming wire. In the paper making apparatus herein shown and described, the water flows from pit 7, below the forming wire, to the stock mixer and screens (not shown), thence it is pumped through a pipe 170 into a stationary tank 171 supported independent of the Fourdrinier machine, the tank having a downwardly inclined bottom to which a plurality of pipes 172 are connected, the number of pipes varying with the width of the machine. Pipes 172 are arranged telescopically in slidable pipes 176, packing joints consisting of parts 173, 174 and 175 serving to prevent leakage between the pipes, the arrangement being in effect a series of water-tight flumes communicating between tank 171 and a stock chest 178 supported between the opposite sides of the breast housing 25. A perforated vertical wall 177 extending through chest 178 transversely of the machine serves for spreading the stock as it flows by gravity to the lower portion of the chest and thence upwardly into a sealed nozzle 180 from which it is discharged under super-hydraulic pressure upon the paper forming wire. The entire structure 173–180 inclusive is supported on the breast housing in any suitable manner and moves with the breast housing in the elevation adjustments thereof, the telescopic arrangements of pipes 172 and 176 compensating for the adjustments. A manhole 179 opens into chest 178, and the perforated wall 177 is removable from the chamber for cleaning.

The nozzle 180 for a Fourdrinier machine 400 inches wide has a capacity for approximately 550 gallons of paper stock and discharges its full capacity a number of times per minute, thus producing a lively action of the stock through flumes 172—176, chest 178 and the nozzle to the forming wire, the arrangement being effective for preventing dead ends in any part of the passage in which stagnant stock can form into lumps.

The detailed structure of nozzle 180 is best shown in Figs. 21–22 and 23. The nozzle housing is sealed at the top, sides and ends, being generally half-round in cross-section, relatively more rigid than ordinary head boxes and breast boards, and presenting a flat front toward the couch end of the machine. For adapting the nozzle to the width of the paper, adjustable bulkheads 184 are supported slidably in the opposite ends of the nozzle housing, each of the bulkheads being connected to a screw 183 supported in a bearing 182 and operable in a nut 183a by a crank 181. Thus, the bulkheads can be moved transversely of the wire, one independently of the other for regulating the transverse length of the discharge aperture of the nozzle and determining the width of the paper. Flexible aprons 188—190 are arranged to form a flexible, trough-shaped bottom for the nozzle, closed at the front, rear and ends, and open to the forming wire as it passes over the breast roll 75, the aprons overlapping one another at their adjoining ends to permit of adjusting the bulkheads 184, the opposite outer aprons 188 being secured to and adjustable with the bulkheads. Aprons 190 are secured to the nozzle housing. The lower edges of the aprons are in engagement with the forming wire and act to seal the nozzle at the lower portions of its opposite sides and ends.

Secured to the under sides of bulkheads 184 are bosses 192a which support deckle guides 192, the slots in the guides which engage the bosses being closed on one side of the guides for forming an interlocked relation with the bosses. The deckle straps 165 are engaged laterally on opposite sides by the guides 193 and are moved with the bulkheads 184 in the lateral adjustments of the latter for determining the width of the paper to be formed. A vent pipe 195 (see Figs. 4 and 5) serves for preventing the nozzle from becoming air-bound.

The deckle straps 165 pass over and under the nozzle, ample vertical clearance being provided in guides 193 for the straps to prevent injury to the forming wire.

The discharge side of the nozzle is regulated by a series of slices, consisting of a master slice 200 which extends across the lower front of the nozzle, being supported by outwardly projecting brackets 201 on the front of the nozzle housing. Screws 203 threaded into the lower ends of brackets 201 on the front of the nozzle housing. Screws 203 threaded into the lower ends of brackets 201 and provided with jam nuts 204 and face plates 205 serve for pressing the master slice against the face of the nozzle for sealing the front of the nozzle above the lower edge of the slice. Screws 206 provided with jam nuts 207 and formed into eye-bolts 208 at their upper ends which are secured to brackets 209 on the front of the nozzle housing by slip pins 210, serve for adjusting the master slice relative to the forming wire to determine the thickness of the paper. For adjusting the screws the same are disconnected at 208—210, the jam nuts 207 resting upon brackets 201 serving to support the slice at the desired elevation above the wire. As shown in Figs. 21 and 23, the slice 200 is shown in raised position for replacing the forming wire on the machine.

The master slice 200 is cut away at its opposite ends for clearing the deckle straps 165, adjustable wing slices 211 being supported at the opposite ends of slice 200 by means of screws 212 which extend through an outwardly turned flange of part 200 and are provided with jam nuts 213 butted against the flange for adjusting the screws. Upwardly extended arms 201a connected pivotally to the wing slices and slidable in strap brackets 202a on the bulkhead housings 184, serve for holding the wing slices against part 200. The wing slices are recessed at 214 for clearing the deckle guides 192.

Within the boundary of the flexible aprons 188—190 the nozzle is open to the forming wire as it passes over the breast roll 75, the paper stock flowing with the movement of the wire under slices 200—211 to the forming table, the elevation of the slices determining the thickness, and the spacing of the deckle straps the width of the paper.

The elevation of the breast end of the machine and the resulting inclination of the forming wire, the increased intensity of the breast shake movement, and the increased activity in the flow of the stock to the forming wire, resulting from the hydro-super-pressure in the sealed nozzle, are factors which result in their combined action in a more uniform and more active flow of the stock to the forming wire and an evener spread of the stock on the wire as it moves to the forming table. With all, the coordinated functions of the several structures described render more practicable the conditions which govern the construction and operation of Fourdrinier machines of large capacity.

An important feature of my invention consists in improved means and method for replacing the paper forming wire on the Fourdrinier machine, the main object attained by the improvement consisting in a very substantial saving of floor and head space in the plant layout with incidental savings in time and labor costs in servicing the paper making apparatus.

In Figs. 10 to 15, inclusive, the Fourdrinier machine is shown in various arrangements for replacing the wire, Figs. 12 and 13 showing modifications in the couch roll construction as herein described, and corresponding modifications in the associated structure for replacing the wire.

The successive steps for replacing the wire consist in raising the couch assembly, as shown in Figs. 12 or 13, according to the construction, in raising the breast end of the machine, removing blocks 52—53 and the structure within the wire loop on the rear side of the machine, in drawing out a series of auxiliary lifts as shown in Fig. 10 and hereinafter described. The machine is lowered upon the auxiliary lifts and the forming wire is strung in the adjacent alcove as shown in Figs. 3 and 15. The wire is then moved transversely into position on the machine, and the machine structure is restored to normal relation.

Figure 16:
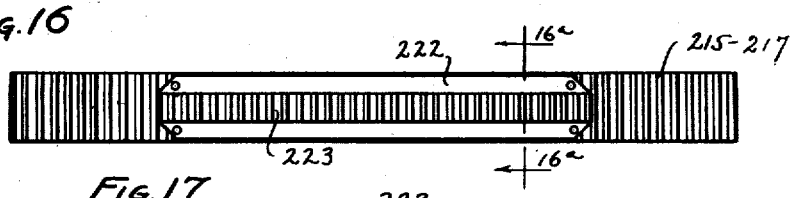
Figure 16A:
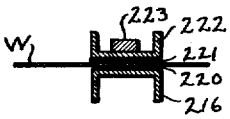
Figure 18:
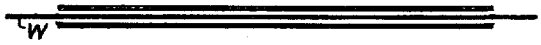

The detail structure of the auxiliary lifts above referred to, as shown in Figs. 16–19, consists in blocks 215 the upper braces of which are formed into racks 217, the blocks being secured to the opposite ends of inverted cross channel rails 216. Supported upon cross rails 216 are removable cross channel rails 222 supporting racks 223 (see Fig. 16a). Between rails 216 and 222 are pads 220—221 for protecting the forming wire when the weight of the machine is on the auxiliary lifts.

Figure 19:
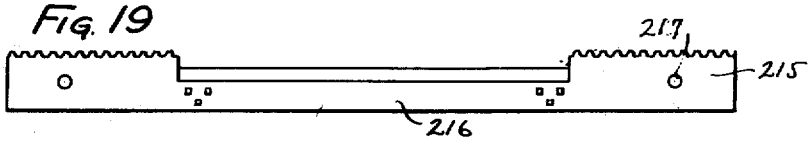

As shown in Fig. 19, the cross rails 216 are recessed or off-set relative to blocks 215, for receiving cross rails 222 and presenting racks 223 flush with racks 217 to constitute continuous rails for moving the auxiliary lifts transversely into and out of position for replacing the wire on the machine. In operating relation of the machine the channel rails 216 are secured to blocks 52—53 for bracing the machine transversely, except rail 216 under the couch assembly which, together with all the rails 222 and pads 220—221, are removed.

Each set of parts 215—224 are alike in construction and constitute the auxiliary lifts for the different sections of the machine, breast end, couch end, couch table, and midsection. Under the couch roll 120 on both sides, blocks 226, offset at 227, and supporting wheels 228, are secured removably to the couch housing 45 (see Figs. 10–11). Extension rails 230, best shown in Fig. 10, between the foundation sills of the machine and the auxiliary lifts, and in Fig. 11, at the ends of the auxiliary lifts on floor 5, constitute part of the structure for replacing the wire and will be further described.

Secured to the rear truss rail 55 is a long shaft 235 which extends from the breast end to the couch end of the machine, the shaft having joint sections 236. Power is applied to the shaft by a worm gear drive 239 (indicated at 239 in Fig. 12—A), by any suitable power connection. A gear 240 is secured to shaft 235 below the breast roll, and directly below the gear mounted on the breast roll housing is a wheel 241. A second gear 242 on shaft 235 is located intermediate the ends of the shaft, a wheel 243 being directly below the gear mounted on the foundation sill of the machine. A third gear 244 on shaft 235 is directly below the wire guide roll 111, a wheel 245 being mounted on the couch housing 45 below the gear. A fourth gear 246 on an end section of shaft 235 is supported on a bracket 247 on cross braces 125—126 of the couch roll assembly. Gears 240, 242, 244, 246 mesh with racks 217—223 of the auxiliary lifts when the lifts are operated for replacing the wire on the machine.

Directly above the couch roll assembly on the couch housing is a motor driven chain hoist 250, and toward the midsection of the machine is a second chain hoist 251 which is manually operable; above the breast roll on the breast housing is a third chain hoist 252 which is also manually operable. In Fig. 12 the chain hoist 250 is shown connected to the couch roll assembly for raising the same for replacing the wire, the couch roll assembly, as the hoist is operated, moving along the inclined ways 58a which shortens the distance between the couch and breast rolls, gives slack to the wire and disengages the couch assembly from housing 45.

In the modified couch assembly shown in Fig. 13, the effect of raising the couch roll is the same as that described in connection with Fig. 12, except that the upward movement of the assembly is vertical with no resulting slack in the wire, which is unnecessary for reasons described in the preceding detailed description of the couch roll constructions.

The use of manually operable chain hoists 251—252 is optional and any suitable means may be employed for raising and supporting the portions of the machine for which the hoists, as here shown, are used, but the motor operated chain hoist 250 for lifting the greater weight at the couch end of the machine from its lower level in the pit in which the couch assembly is supported is essential to effective handling of the structure for replacing the wire.

As stated in the foregoing description of the planes of movement of the paper forming wire, the bottom draw of the wire has a pronounced rise above the lower crown faces of the couch and breast rolls. As shown in Figs. 12–14 inclusive, the means employed at both ends of the machine for spreading the wire consist in brackets 254 which are connected at 225 on one side of the machine to blocks 215 of the auxiliary lifts, and act as guides for the wire in its transverse movement. A series of removable stud posts 255, secured to the couch housing 45 and to the breast housing 25, transverse cables 258, and cable tighteners 257, connected to the stud posts 255 and to the back wall of the alcove 4 at 260. The cables pass through pipes 261 which slide on the cables and are as long as the width of the machine, the arrangement being best shown in Fig. 15, the cables being substantially twice the length of the pipes. Brackets 254 serve for spacing the cables and also for supporting pipes 261 and the wire strung on the pipes for moving the wire transverse of the machine.

The wire spool 263, as shown in Fig. 14, upon which the replacement wire is wound as shipped by the manufacturer, rests upon brackets 262 which are temporarily attached to the couch housing 45, the wire being wound as usual upon two round members which are slightly longer than the width of the wire. A pole 265 is passed through the outside end loop of the wire ready for placing it on the machine. After the old wire is removed, pole 265 is supported in opposite hollow members 266 of a trolley stand 268 (see Fig. 20), which is slidably supported on the lower webs of rails 50. Drop hangers consisting of parts 267—268 serve for suspending the pole from the truss rails 50.

The trolley stand is moved along rails 50 from the couch end to the breast end of the machine, the wire unwinding on spool 263 as the outer end of the wire loop is drawn forward. The transverse cables 258 and pipes 261 are then passed through the wire loop and the cables are drawn taut. In this position, the forming wire is extended loosely across rails 216 and pads 220. Pads 221 and rails 222 are then passed through the wire loop and are secured to rails 216, with the wire between the pads, the machine being in the position shown in Figs. 11–14–14A.

The wire is then moved transversely into its operating plane on the machine. With the wire in place, blocks 52—53 are replaced, pads 220—221 and pad rails 222 are removed, the auxiliary lift under the couch structure is removed, the couch assembly is lowered to normal position, and all other parts removed for replacing the wire are reassembled on the machine.

By the constructions and methods shown and described, the paper forming wire can be replaced on the Fourdrinier machine from either side, by locating the alcove 4 accordingly on the side of the machine from which the wire is to be replaced, the saving of space on the front aisle of the machine being the same in either case.

In the practice of my invention it is contemplated to employ two methods of replacing the paper forming wire on the Fourdrinier machine, the one method as described in the foregoing specification, consisting in stringing the wire loop along the machine, clearing and raising the machine for receiving the wire and moving the wire transversely into position.

In the second method as illustrated in Figs. 3 and 11, the portions of the Fourdrinier machine within the wire loop, including the forming table and the breast and couch rolls, are moved laterally into the alcove, the removable structure rolling upon extension rails 230 which form a track for supporting it. The wire upon its supporting reel is then moved into position at the couch end of the machine, is unwound, and strung between the couch and breast ends, the loop being spread and supported on the cables and pipes 258—261 which are arranged in the manner described in connection with Fig. 15. The portion moved into the alcove being operated over the supporting rails by operation of shaft 235.

Pad rails 222 are then removed from the auxiliary lifts, the wire spool is placed on temporary supports 262 on couch housing 45, the outer end of the wire loop being supported by pole 265 which is connected to drop hangers 268. The drop hangers are then moved along rails 50 to the breast end of the machine for unwinding the wire.

Transverse cables 258 and pipes 261 slidable thereon are then placed as shown in Figs. 14 and 14—A, the lower span of the wire resting upon pads 220 placed on rail 216. Pads 221 are passed into the loop and placed over pads 220 with the wire between the pads, pad rails 222 then being placed in position as shown in Fig. 19. Power is then applied to shaft 235 for returning the structure moved into the alcove over the auxiliary lifts to normal relation, all other parts removed being also restored to normal relation. Pad rails 222 and pads 220—221 are removed from the auxiliary lifts, and the wire stringer cables 258 and pipes 261 are disconnected and removed.

The motor hoist 250 which was disconnected for stringing the wire is again connected to the couch assembly, the auxiliary lifts below the couch being removed, and the couch assembly is lowered to normal position. The wire carrying rolls 112, 114 and 117—118 are reassembled in their normal relation.

The saving of space in the plant layout for the Fourdrinier machine is further effected in certain improvements and novel arrangements of the press and dryer sections of the paper making apparatus, making it possible to reduce the front side aisle space along the dryers to the same width of the aisle along the Fourdrinier machine.

The suction couch roll assembly of the Fourdrinier machine being located in a pit, in the preferred arrangement herein shown and described, substantially below the floor 5, the base line of the press and dryer sections of the apparatus are accordingly lower, being located on floor 1.

As shown in Figs. 4—A and 4—B, a series of rolls 279 are traversed by the first felt 280. A lower suction press roll 281, connected with a suction pipe 281a, and supported on removable bearing blocks 285—286, is of the usual construction. Opposite press roll 281 is the upper press roll 289, journaled on pivoted arms 288, the felt passing between the rolls.

A doctor blade 293 of novel arrangement coacts with press roll 289, the blade being pivoted on brackets 293a on arms 288. The blade is flexible and is held in yieldable engagement with the periphery of roll 289 for keeping the roll free of adhering paper stock.

Coacting with the doctor blade 293 is a tray 294 which is supported on the machine frame and extends transversely of the machine along roll 289. The tray supported independently of the doctor blade and roll 289 is different in this respect from the usual arrangement in which the blade, tray and press roll are combined in an integral assembly.

Wet paper stock adhering to roll 289 is removed by the doctor blade 293 and accumulates in tray 294. Under normal operation of the apparatus the accumulation of wet broke in the tray is small, but upon interruption of normal operation of the apparatus, such as will be caused by a break in the paper, a heavy accumulation of the wet broke piles up in the tray. In an interruption of one minute duration, a ton or more of broke may thus accumulate in the tray, hence the importance of providing a substantial structure for meeting these abnormal conditions of operation. Under the present common practice, when such conditions arise, the paper stock at this point piles up on the doctor blade, forces the blade against the roll with excessive pressure and frequently causes breaks in the paper to occur. The improved arrangement of the doctor blade and tray in their relation to the press roll as shown and described overcomes this difficulty.

Secured to the swinging arms 288 are brackets 295 supporting a cross beam 296 which forms a rack for a carriage 296a operable transversely of the machine along press roll 289. A flexible blade 297 is supported in a pivot bearing 298 on carriage 296a, and weighted at 299 for holding the lower edge of the blade against the periphery of roll 289. An endless cable 300 (see Fig. 24), operable over pulleys 301 mounted on the opposite ends of cross beam 296, is connected to the carriage 296a. The machine operator standing on floor 5 can operate the carriage transversely of the machine by manipulating the cable for skinning the paper off the face of the roll when a break in the paper occurs.

An auxiliary press roll 303 coacts with press roll 289, the felt 280 and the paper P passing through the nip between the rolls 281—289, thence the felt moves downward around one of the rolls 279, and thence upward between rolls 289—303.

Owing to the capillary action on felt 280 as it passes through the nip between rolls 281—289, the felt is stretched, more or less, and becomes unequal in length to the length of the adjacent paper P. For restoring the felt to normal condition it is hitched or stretched over roll 279, the felt moving into normal relation with the paper again between rolls 281 and 303.

By the arrangement of the press rolls and felts as above described, the paper P leaves roll 289 equal in strength of the paper on the second press of an ordinary machine, thus gaining the important advantages of the shorter travel of the paper and the space saving arrangement of the presses.

Figure 4A:
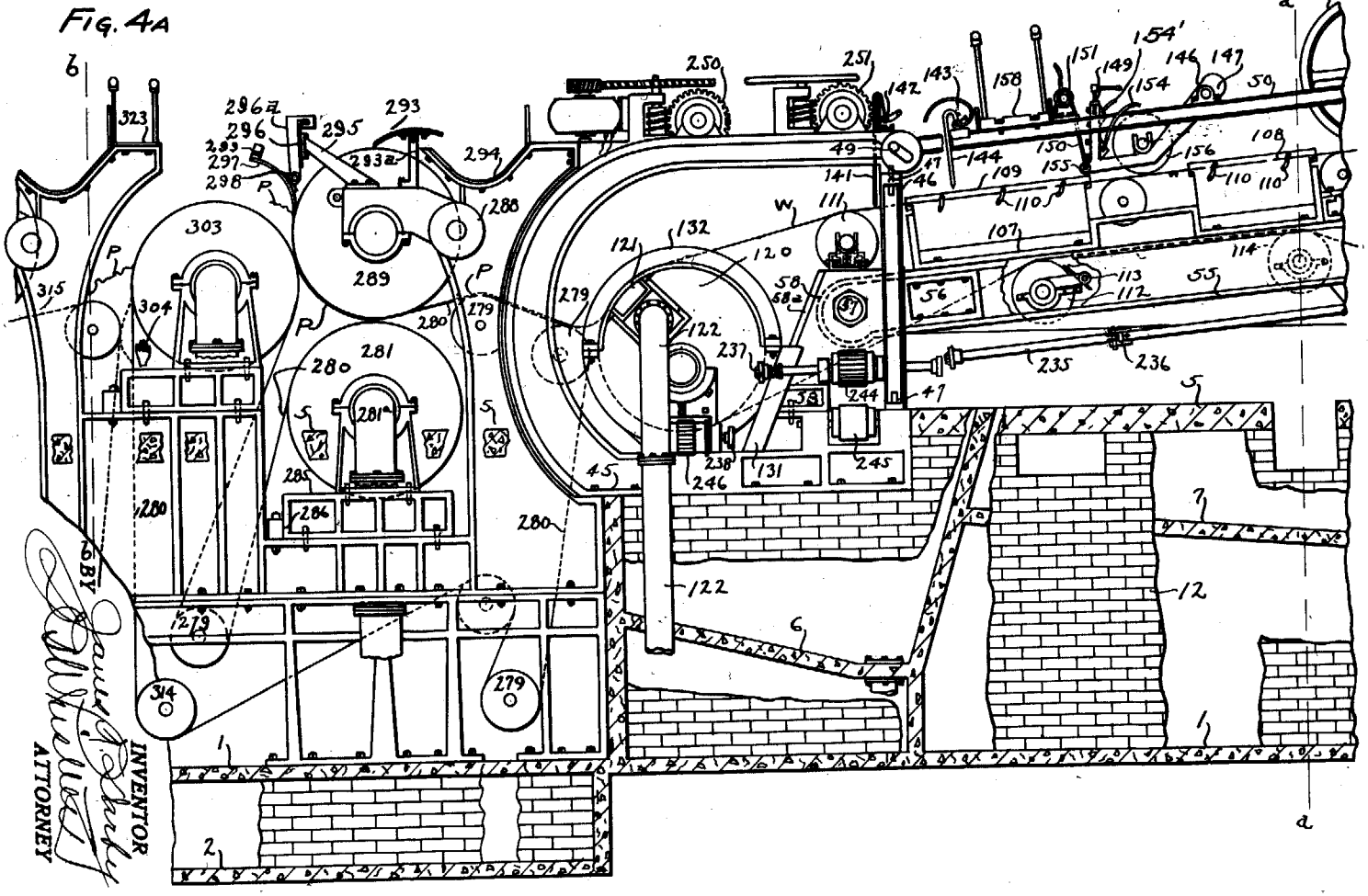

The end of the paper adhering to press roll 289 when a new run of paper is put on the machine is removed by the doctor blade 297, as indicated in Fig. 4a, and falls upon the felt and is carried around roll 303. The machine operator by placing his hand inside the felt and pressing outward as indicated at 304 will cause the paper to be moved into engagement with a second felt 315 which traverses felt rolls 314 and the press rolls of the second press section.

A second series of press rolls, including a lower suction roll 316, upper roll 325 and auxiliary roll 330 are arranged substantially in the same relation as the rolls of the first press section. Brackets 339, secured to blocks 335, support a doctor blade 340 which coacts with the periphery of roll 330 which is usually rubber covered and constitutes, together with roll 325, a smooth roll press which acts to remove the wire and felt marks from the paper.

After passing through the nip between rolls 325—330, the paper tends to adhere to one roll or the other and may thus cause a break in the paper, the broke adhering to one or both rolls. Broke adhering to roll 325 is removed by the doctor blade 297 in the manner described in connection with press roll 289, the broke as it is skinned off the roll falling upon the roll 330 and is removed from the latter roll by the doctor blade 340, the accumulation of broke falling upon the first dryer roll 345 being thence conducted by carriers C over the dryers.

Foot boards 323 and 341 are extended across the machine above the press sections, the frame structure of the presses being supported on the fundation sills 12 at floor elevation 1.

The general structure of the press section of the paper making apparatus being at a substantially lower level than the Fourdrinier machine, gravity movement of the paper is utilized in greater degree than in the usual practice, which further tends to favorable conditions for high speed operation, and conditions favorable for minimizing the requirement of human skill for supervising the operation of the apparatus, having particular reference to handling breaks in the paper and meeting the exigencies of operation arising therefrom In common practice in the construction and operation of paper making apparatus, a condition of material waste arises, when a new run of paper is put on, upon arrival of the wet web of paper from the presses at the dryer sections. The accumulation of broke at this point must be returned to the beater room to be again converted into pulp. Any excess in the accumulation of broke, therefore, represents accordingly decrease in production and the added cost of reproduction.

For conducting the paper web from the press section to the dryer section, under the present practice, the operator must conduct the end of the web manually which, when relatively wide paper is being produced, is difficult of accomplishment and results frequently in initial failures, repeated attempts being usually necessary before the transfer of the paper from one section to the other is accomplished. Any delay or interruption in the movement of the paper at this point results in an accumulation of broke, increasing in volume in proportion to the interval of the interruption, all of which must be returned to the beater room, reduced to pulp, and run again over the Fourdrinier machine and the presses.

For minimizing waste and difficulties arising attendant upon starting a new run of paper on the apparatus, felts traversing the dryer rolls are commonly used. These in their first cost and in their replacements add heavily to the equipment costs. The felts also under certain conditions of operation tend to cause breaks in the paper as it passes over the dryers with the attending interruptions in production; the felts further tending more or less to cause uneven drying of the paper and the resulting lowering in the quality of the product.

When breaks in the paper occur on the dryer section, under conditions of the present practice, and the paper wraps on the dryer rolls and piles up at points where the breaks occur, the operators cut the paper off the rolls with a paper knife or spear secured to an end of a long pole for reaching from one end to the other of dryer rolls, thus requiring the full width of the front side aisle of the apparatus for manipulating the knife. Manipulating these long, unwieldy paper cutting devices frequently results in injuries to the dryer felt to such an extent that the felts must be torn off and replaced with the resulting difficulties arising from interrupted operation above described.

An important feature of my invention, in addition to the saving of aisle space in the plant layout, consists in an improvement of the means commonly used for threading the paper on the dryers, when a new run of paper is put on, which minimizes and in large measure overcomes conditions which tend to cause breaks in the paper, and also reduces the difficulties in handling the broke when breaks occur.

As shown in Fig. 4—B, the paper P is stripped off press roll 330 by the doctor blade 340, the end of the web falling by gravity upon the first dryer roll 345 and moving with the roll in the proper direction, no felts being used on the dryers as here shown.

The paper carriers C, here shown in a modified form, are of well-known construction, being commonly used in the art. For conducting the paper over the dryers, a "tail" or lead strip is formed of the paper at one corner of its forward edge adjacent the carriers and drawn out between the opposite cables C, which operate on one side of the machine only, the forward edge of the paper being unsupported transversely in its forward movement, except by the felt above mentioned. When the paper breaks, the carriers C and likewise the felts are ineffective for further advancing the paper web, and conditions of the accumulation of broke at points where breaks occur and the attending difficulties immediately arise. Also the carriers in their usual arrangement cannot be utilized for conducting the paper from the press section to the dryer section.

The dryer section of the apparatus here shown is of the well-known vertical type, the structure being divided into a plurality of separate power operated groups, the dryer rolls of the first group being numbered from 345 to 353 inclusive supported on end frames resting on the foundation sills 12.

Vertical dryers are used more especially in the manufacture of paper board which is produced upon relatively low speed apparatus. An object attained in my invention consists in modifications of construction and operation of vertical dryers for adapting the same for producing lighter grades of paper, such as newsprint, on high speed apparatus.

The modifications comprised in the improvements herein set forth consist more especially in an added feature to the carriers for threading the paper on the dryers, when a new run of paper is put on, which acts to sustain the forward edge of the paper cross-wise from edge to edge of the web, thus minimizing the possibility of breaks occurring in the paper, being more effective for handling breaks when they occur, and adapting the threading means for handling light paper produced at high speed.

The detail structure of the paper threading means as best shown in Fig. 25 consists in sheaves 355—356 formed in the periphery of the dryer rolls adjacent their opposite ends, the opposite cables or carriers 357—358 traversing the sheaves at equal speeds, running parallel one with the other in their forward movement over the dryers, their return movement being in opposite courses as in the usual practice.

The improvement added to the carriers in my invention consists in a series of cross straps 366 which are secured to and span the space between carriers 357, carriers 357 operating in the lower course of the paper threading mechanism. The cross straps may be made of any suitable material, such as very thin strips of metal, preferably a non-corrosive metal or textile material, or composition fabrics, the straps being spaced one from another as conditions of operation require.

Cables 358 which operate in the upper course of the carriers are connected in like manner by cross straps 267, straps 366—367 being spaced one from another laterally to avoid direct registration of the straps one upon another as they pass over the dryer rolls. While the impress of the straps on the paper is not perceptible on the finishd product, the lateral spacing of the straps as described is advantageous for supporting the paper between the straps.

The cross straps 367 are connected one to another by straps 368 extended in the direction of movement of the cables 358, being extended at inverse angles between adjacent straps, or staggered, as shown in Fig. 25. Cross straps 366 are connected one to another by straps 369 extended parallel, as here shown, with cables 357. In their return course, carriers 357 operate over sheaves 370, and carriers 358 over sheaves 371.

Joining of the opposite cables 357—357 and 358—358 with the cross straps and connecting the latter at intermediate points between the cables in the direction of movement of the carriers, acts to support the paper transversely of its full width as it is carried over the dryers in the threading operation. As many of the transverse and longitudinal straps may be used in the construction of the carrier as will be required for effective control of the paper. The improved carrier not only supports the forward edge of the paper web but also supports the web between dryer rolls. The tendency of breaks to occur in the paper incidental to the operation of threading the paper on the dryers is thus reduced. A break in the paper from whatever cause at any point on the dryers will be conducted by the carriers to the calendars where it can be handled by the operators without difficulty, without slowing down the dryers, and without the accumulation of broke at intermediate points where the breaks occur.

The improved threading mechanism also acts to conduct the end of the wet paper web as it leaves the press section to the first dryer roll without manually guiding the web at this point.

The complete dryer apparatus as here shown is made up of two sections which are substantially the same in construction and operation except as to certain features which will be explained. Each section is power operated as an independent unit but in coordinated relation with the other section. The separate sectional arrangement of the dryers is advantageous in the operation of the paper making apparatus as a whole, being rendered more flexible, and giving a balanced distribution of the starting torque of the machine, which in large apparatus presents difficulties.

It will be understood that the sectional dryers herein shown and described are for the purpose of illustration, it being contemplated in the practice of my invention to increase the number of dryer sections and also the roll capacity of each section according to the requirements.

The two sections of the dryers are joined together by an overhead frame structure 363, the detail construction and arrangement of the second section including the second carriers C operable over sheaves 395—403 and dryer rolls 388—387 corresponding generally to the first section.

In Fig. 4—C, a single stack of calendar rolls is shown for finishing the paper, the paper passing from a "baby" dryer roll 408 to the first calendar roll 428 and thence downward over the calendar rolls 426—416 to a reel 460 for winding the finished paper in a roll P—R. As here shown, a short section of the carriers C, 435—436, serves for conducting the paper web from the dryers to the calendars, the carriers operating over opposite sheave pulleys mounted on the journals of the dryer roll 408, the carrier cables traversing the opposite ends of the upper calendar rolls 428—426, one of the cables passing direct from roll 426 to roll 408, and the other from roll 426 over sheave pulleys 437 and thence to roll 408 for effecting their return course.

As here shown, provision is made for effecting a higher finish of the paper than that obtainable on a single stand of calendars. To this end auxiliary calendar rolls 442 are supported on opposite sides of the calendars in operating relation with intermediate calendar rolls 418—420, the bearings 444 in which the rolls are supported being slidable and adjustable by means of hand screws 451, as best shown in Fig. 26, for adjusting the auxiliary rolls relative to the calendar rolls. A jack shaft 445 supported in a bracket 448, operably connected to each of the rolls 442, and having a cone pulley 447 secured thereto serves for operating the rolls at selected speeds for effecting the desired finish of the paper. The friction on the paper as it passes between the auxiliary rolls and the calendar rolls operating at different speeds, acts to produce a higher finish than the ordinary finish given to the paper by the calendar rolls. By using only one of the auxiliary finishing rolls or by adjusting the rolls for exerting different pressures on the paper, when two rolls are used, a contrasting finish can be given to the opposite sides of the paper.

In the usual practice where higher finish of the paper than that obtained from the calendars is desired, additional calendar equipment is required which adds substantially to the plant investment and to the operating space.

The stock beater shown in detail Fig. 29 is of the usual construction and may be employed for reducing broke accumulating at the calendars to pulp, which will be pumped from the beater to the stuff chest, thus overcoming the usual practice of carting broke stock to the beater room, the arrangement here shown being more advantageous in the practice of my invention in view of the relatively limited aisle space along the apparatus. In the contemplated arrangement, the beater will be located in the pit below the calendars in the relation indicated by lines *h*—*h* in Figs. 4—C and 29.

I claim as my invention:

1. The combination with a Fourdrinier paper making machine including a Fourdrinier table provided in operation with a forming wire, a press structure and a dryer structure and having a relatively narrow aisle extending along the side of the press and dryer structures and of a width materially less than the width of said Fourdrinier table and of insufficient width to permit disposition of the width of the wire laterally of the width of the machine of a laterally extending alcove extending along the Fourdrinier table and providing lateral clearance along the table substantially equal in width to the width of said table to permit disposition of the width of the table and the paper forming wire laterally of each other and also permitting relative movement between the table and the paper forming wire for placing the wire upon said table.

2. The combination with a Fourdrinier paper making machine including a Fourdrinier table provided in operation with a forming wire, a press structure and a dryer structure and having a relatively narrow aisle extending along the side of the press and dryer structures and of a width materially less than the width of said Fourdrinier table and of insufficient width to permit disposition of the width of the wire laterally of the width of the machine of a laterally extending alcove extending along the Fourdrinier table and providing lateral clearance along the table substantially equal in width to the width of said table to permit disposition of the width of the table and the paper forming wire laterally of each other and also permitting relative movement between the table and the paper forming wire for placing the wire upon said table, means adapted to be extended into said lateral alcove for supporting the forming wire with its width laterally along the side of the width of the table and means for effecting relative lateral movement between the wire and said table for placing the wire thereon.

3. The combination with a Fourdrinier paper making machine including a Fourdrinier table provided in operation with a forming wire, a press structure and a dryer structure and having a relatively narrow aisle extending along the side of the press and dryer structures and of a width materially less than the width of said Fourdrinier table and of insufficient width to permit disposition of the width of the wire laterally of the width of the machine of a laterally extending alcove extending along the Fourdrinier table and providing lateral clearance along the table substantially equal in width to the width of said table to permit disposition of the width of the table and the paper forming wire laterally of each other and also permitting relative movement between the table and the paper forming wire for placing the wire upon said table, and wire carrying rails disposed transversely beneath the bottom of the Fourdrinier table and beneath the bottom run of the forming wire, said rails adapted to remain in position transversely beneath the bottom of the table when said machine is in operation.

4. The combination with a Fourdrinier paper making machine including a Fourdrinier table provided in operation with a forming wire, a press structure and a dryer structure and having a relatively narrow aisle extending along the side of the press and dryer structures and of a width materially less than the width of said Fourdrinier table and of insufficient width to permit disposition of the width of the wire laterally of the width of the machine of a laterally extending alcove extending along the Fourdrinier table and providing lateral clearance along the table substantially equal in width to the width of said table to permit disposition of the width of the table and the paper forming wire laterally of each other and also permitting relative movement between the table and the paper forming wire for placing the wire upon said table, and means for transferring the paper from the press structure to the dryer structure, said means reducing the aisle clearance necessary along the press and dryer structures by eliminating the necessity for reaching across the machine to cut the paper across the dryer structure in case of breakage of the paper.

5. The combination with a paper making machine including a couch roll assembly, a breast roll assembly and press and dryer structures of a plant having a plurality of floors at different levels and a pit below the upper floor, means for supporting the breast roll assembly on the upper floor, means for supporting the couch roll assembly in the pit with the couch roll at a lower level than the breast roll and means for supporting the press and dryer structures upon the lower floor and below the couch roll with the press and dryer rolls all disposed at substantially the same level or below the level of the couch roll.

6. The combination with a paper making machine including a Fourdrinier part having couch and breast rolls and a forming table, of a press structure, a dryer structure, a plant having an upper floor and a lower floor, means for supporting the Fourdrinier part on the upper floor, means for supporting the press and dryer structures on the lower floor at a lower level than the Fourdrinier part and with the rolls of said press and dryer structures all disposed at substantially the same level or below the level of the couch roll, a laterally extending alcove on the upper floor and along the Fourdrinier part and substantially on a level with said upper floor, means adapted to be extended into said lateral alcove for supporting the width of a forming wire laterally along the side of the width of the Fourdrinier part, and means for effecting relative lateral movement between the wire and the forming table of the Fourdrinier part for placing the wire thereon.

7. A plant for making paper including a plurality of floors at different elevations for the paper making apparatus consisting in a Fourdrinier machine partially supported on one of said floors, the couch end of said machine and press and dryer sections of said apparatus supported on a floor at a lower elevation than the Fourdrinier floor, a lateral extension of the Fourdrinier floor at one side thereof and substantially on a level therewith and means operable on said extended floor for effecting relative movement between said machine and the paper forming wire thereof for replacing said wire thereon, and means for elevating the couch end of the machine incidental to replacing said wire.

8. A plant for making paper including a plurality of floors at different elevations for the paper making apparatus consisting in a Fourdrinier machine partially supported on one of said floors, the couch end of said machine and press and dryer sections of said apparatus supported on a floor at a lower elevation than the Fourdrinier floor, a lateral extension of the Fourdrinier floor at one side thereof and substantially on a level therewith, and means operable on said extended floor for effecting relative movement between said machine and the paper forming wire thereof, and means for elevating said couch roll assembly and moving the same coincident with the elevating thereof toward the breast end of said machine for effecting slack in said wire incidental to replacing the wire on said machine.

9. A plant for making paper including a plurality of floors at different elevations for the paper making apparatus consisting in a Fourdrinier machine partially supported on one of said floors with the breast end of said machine raised and the paper forming wire thereof inclined downward toward the couch end of the machine, the couch end of said machine and press and dryer sections of said apparatus supported on a floor at a lower elevation than the Fourdrinier floor, a lateral extension of the Fourdrinier floor at one side thereof and substantially on a level therewith and means operable on said extended floor for effecting relative movement between said machine and the paper forming wire, and means for lowering the breast end and raising the couch end of said machine, incidental to replacing the wire on said machine.

10. A plant for making paper including a plurality of floors at different elevations for the paper making apparatus consisting in a Fourdrinier machine partially supported on one of said floors, the couch roll assembly of said machine being supported at a lower elevation than the breast assembly thereof, press and dryer sections supported substantially at the same elevation as said couch assembly with the press and dryer rolls disposed at substantially the same level as said couch roll assembly, and a floor along the rear side of the Fourdrinier machine and said press section at an elevation between the floor elevations of the breast end of the Fourdrinier machine and said press and dryer sections.

11. A plant for making paper including apparatus consisting of a Fourdrinier machine, and an extension of the plant structure along the Fourdrinier machine of said apparatus on the rear side thereof, substantially equal in width thereto, and providing clearance for relative movement between said machine and the paper forming wire thereof for replacing said wire thereon, and an aisle along the front side of said machine substantially narrower than the width of said machine, a press section in line with the Fourdrinier machine, and means operable from said front side aisle within the plane of the machine across a press roll for removing broke paper therefrom.

12. A plant for making paper including apparatus consisting of a Fourdrinier machine, press and dryer sections for receiving the web of formed paper from the Fourdrinier machine, means for threading the paper on the dryers including cables operable along the ends of the dryer drums and elements movable with the cables, extending therebetween along the drums and acting to support the paper web from edge to edge as the web moves over the drums.

13. A plant for making paper including apparatus consisting of a Fourdrinier machine, press and dryer sections for receiving the web of formed paper from the Fourdrinier machine, means for threading the paper on the dryers including cables operable along the opposite ends of the dryer drums and elements movable with the cables, extending transversely between the cables, along the dryer drums and connected one element to another by members thereof extended parallel with the cables, and acting to support the paper web from edge to edge as the web moves over the drums.

14. A plant for making paper including apparatus consisting of a Fourdrinier machine, press and dryer sections for receiving the web of formed paper from the Fourdrinier machine, means for threading the paper on the dryers including cables operable along the ends of the dryer drums and elements movable with the cables, extending therebetween along the dryer drums and acting to support the paper web on opposite sides from edge to edge thereof as the web moves over the drum.

15. A plant for making paper including apparatus consisting of a Fourdrinier machine, press and dryer sections for receiving the web of formed paper from the Fourdrinier machine, means for threading the paper on the dryers including cables operable along the opposite ends of the dryer drums and elements of thin pliable material connected to the cables, extending therebetween along the dryer drums, spaced one element from another and joined together by members thereof extending between the elements and acting to support the paper web from edge to edge as the web moves over the drums.

16. In a paper making machine provided in operation with a forming wire, the combination of a nozzle housing for the paper stock, means for supplying the stock to said housing, and a nozzle having a stock emission outlet adapted for discharging the stock from said housing upon the forming wire, said nozzle having yieldable wall means engaging the forming wire.

17. In a paper making machine the combination of a nozzle housing for the paper stock, means for supplying the stock to said housing and a nozzle having a stock emission outlet adapted for discharging the stock from said housing, said machine having a single forming wire movable along the bottom only of said nozzle and said nozzle being sealed completely on all remaining sides around said stock emission opening.

18. In a paper making machine the combination of a nozzle housing for the paper stock, means for supplying the stock to said housing, a nozzle having a stock emission outlet adapted for discharging the stock from said housing, said machine having a single forming wire movable along the bottom only of said nozzle for receiving the stock from said nozzle, said nozzle having yieldable wall means engaging the forming wire and sealed completely on all remaining sides around said emission opening and bulk head means slidable in the nozzle housing for adapting the outlet from the nozzle to different widths of paper.

19. A plant for making paper including apparatus consisting of a Fourdrinier machine, the paper forming wire of which in its bottom draw is substantially concavical on its lower face, and means for moving the couch roll assembly of said machine toward the breast end thereof for effecting slack in the wire for replacing the same on said machine.

20. A plant for making paper including apparatus consisting of a Fourdrinier machine, the paper forming wire of which in its bottom draw is substantially concavical on its under side, and structural parts of said machine coacting with said wire in the bottom draw thereof, removable for effecting slack in the wire for replacing the same on said machine.

21. In a paper making machine provided in operation with a forming wire the combination of a nozzle housing for the paper stock, means for supplying the stock to said housing, bulk head means slidable in the nozzle housing for adapting same to different widths of paper and flexible sealing apron means secured to said bulk head means and forming a nozzle for discharging the stock from said housing to the forming wire.

22. In a paper making machine provided in operation with a forming wire the combination of a nozzle housing for the paper stock, means for supplying the stock to said housing, bulk head means slidable in the nozzle housing for adapting same to different widths of paper, flexible apron means secured to the bulk head means and forming a nozzle for discharging the stock from said housing to the forming wire, said apron means engaging the forming wire and defining a stock emission opening thereto and sealing said nozzle around said opening.

23. In a paper making machine provided in operation with a forming wire the combination of a nozzle housing for the paper stock, means for supplying the stock to said housing, bulk head means slidable in the nozzle housing for adapting same to different widths of paper, and deckle guides secured to and carried by said bulk head means.

24. In a paper making machine the combination of a nozzle housing for the paper stock, means for supplying the stock to said housing, a nozzle having a stock emission outlet for discharging the stock from said housing, said machine having a single forming wire movable along the bottom of said nozzle and receiving the stock therefrom and a deckle strap passing around said nozzle housing.

25. In a paper making machine provided in operation with a forming wire the combination of a nozzle housing for paper stock, means for supplying the stock to said housing, a nozzle having a stock emission opening for discharging the stock from said housing to said forming wire and completely sealed around said opening and a control sluice for said nozzle opening.

26. In a paper making machine provided in operation with a forming wire the combination of a nozzle housing for paper stock, means for supplying the stock to said housing, a nozzle having a stock emission opening for discharging the stock from said housing to said forming wire and completely sealed around said opening and a control sluice for said nozzle opening, said sluice comprising a master sluice and adjustable wing sluices supported at opposite ends of said master sluice.

27. In a paper making machine provided in operation with a forming wire the combination of a nozzle housing for paper stock, means for supplying the stock to said housing, a nozzle having a stock emission opening for discharging the stock from said housing to said forming wire and completely sealed around said opening and a control sluice for said nozzle opening, said sluice comprising a master sluice, adjustable wing sluices supported at opposite ends of said master sluice, and arms connected pivotally to said wing sluices and slidable on said master sluice.

28. In a suspension table paper making machine of the class described provided in operation with a forming wire the combination of a truss rail structure, table rails, saveall means and means for shaking the machine independently of said truss rail structure and independently of said table rails and said saveall means.

29. In a paper making machine the combination of a truss rail structure, a hollow shaft, spiders on said shaft, a breast roll supported on said spiders, a yoke housing and bearings journaling the opposite ends of said shaft and mounted loosely in said yoke housing, said bearings being slidable transversely upon said truss rail structure for producing a lateral shaking action.

30. In a paper making machine the combination of a truss rail structure, a hollow shaft, spiders on said shaft, a breast roll supported on said spiders, a yoke housing, bearings journaling the opposite ends of said shaft and mounted loosely in said yoke housing, said bearings being slidable transversely upon said truss rail structure for producing a lateral shaking action, and spring means for compensating for the end thrusts.

31. In a paper making machine the combination of a truss rail structure, a hollow shaft, spiders on said shaft, a breast roll supported on said spiders, a yoke housing, bearings journaling the opposite ends of said shaft and mounted loosely in said yoke housing, said bearings being slidable transversely upon said truss rail structure for permitting a lateral shaking action, a tie shaft extending through the breast roll shaft, a yoke secured to said tie shaft and provided with cam portions and a shaker cam cooperating with the cam portions of said yoke for imparting an axial shaking action to said breast roll.

32. In a paper making machine provided in operation with a forming wire the combination of a shaking wire carrier roll cooperating with said wire, a non-shaking vertical adjustable carrier for said roll and a doctor member carried by said non-shaking vertical adjustable carrier roll carrier and adapted for transverse unitary removal and replacement therewith.

33. In a Fourdrinier paper making machine the combination of a forming table, a breast roll at one end of said table, a couch roll at the other end of the table, and guide means for said couch roll and disposed obliquely relative said breast roll, said couch roll being movable out of normal operative position upon said guide means and toward said breast roll by said movement to shorten the distance around said couch and breast rolls.

34. In a Fourdrinier paper making machine the combination of a forming table, a breast roll at one end of said table, a couch roll at the other end of the table, and guide means for said couch roll inclined obliquely upwardly relative said breast roll, said couch roll being adapted to be lifted out of normal operative position upon said guide means and movable toward said breast roll by said movement to shorten the distance around said couch and breast rolls.

35. In a paper making machine the combination of a couch roll, a forming wire trained about said roll and means for moving said couch roll on diagonal guide means for removing said roll from normal operative position and toward the breast end of the machine for producing slack for the application of a wire to the machine.

36. The method of changing a wire or the like, which consists in feeding it through a gap in the side frame of the machine, the machine above the gap being supported by the part of the frame lying below the gap.

37. In the method set forth in claim 36, the step of supporting the wire on members which carry the weight of the upper part of the machine during the feeding operation.

38. The method of changing a wire which consists in feeding the wire between members through a gap in the side frame of a machine, said members carrying the weight of that portion of the machine above the gap.

39. The method of changing a wire which consists in providing the machine frame with a gap and feeding the wire therethrough by means of rollers.

40. In the method set forth in claim 39, the step of providing the wire with members to engage the rollers and prevent injury to the wire thereby.

41. The method of changing a wire which consists in providing frame with removable sections so that a gap may be formed in a side frame thereof, removing the sections and supporting that part of the frame above the gap by members capable of being fed laterally therethrough, said members being placed in pairs and carrying the wire therebetween.

42. In a paper handling machine, a side frame having a gap therein designed to permit feeding of a wire therethrough while permitting the supporting of that part of the frame above the gap by that below the gap.

43. In a paper making machine of the class described provided in operation with a forming wire loop, the combination of a breast end structure comprising parts disposed outside the wire loop and parts disposed within said loop and supported by the parts outside the loop, and means for vertically adjusting said structure, the parts of said structure within and outside the loop remaining in substantially fixed relation and in relative alignment, one part with respect to the other, laterally, longitudinally and vertically in the operation and vertical adjustment of said structure.

44. In a paper making machine of the class described provided in operation with a forming wire loop, the combination of a structure disposed outside the wire loop, a structure disposed within the wire loop and supported by the structure outside the wire loop, a breast roll on said structure within the loop, means for shaking said breast roll, and means for vertically adjusting said structures and for maintaining the same and said shaking means in substantially fixed relation and relative alignment, each with respect to the other, laterally, longitudinally and vertically in the operation and vertical adjustment of said structures.

45. In a paper making machine of the class described provided in operation with a forming wire loop, the combination of a non-shaking remote end structure disposed outside the wire loop, a non-shaking structure disposed within the wire loop and supported by said structure outside the loop, a breast roll on said non-shakable structure within the loop, means for shaking said breast roll by multiple length strokes, and hydraulic jack means for adjusting said structures vertically, said structures and said shaking means remaining in substantially fixed relation and relative alignment laterally, longitudinally and vertically in the operation and vertical adjustment of said structures.

46. In a paper making machine of the class described provided in operation with a forming wire loop and having a breast end, the combination of non-shaking supporting structures outside and within the wire loop, a shakable breast roll disposed within the loop and supported upon said structures, means for adjusting the structures vertically at the breast end, a paper material stock inlet nozzle supported on said vertically adjustable breast end structure outside the wire loop and in alignment therewith, and means whereby said structures and said breast roll are maintained in alignment relative each other in adjustment.

47. In a paper making machine of the class described provided in operation with a forming wire loop and having a breast end, the combination of non-shaking supporting structures outside and within the wire loop, a shakable breast roll disposed within the loop and supported upon said structures, hydraulic jack means for adjusting the structure outside and within the wire loop and the breast roll vertically in unison, and a paper material stock inlet nozzle supported on said vertically adjustable breast end structure outside the wire loop and adjustable therewith.

48. In a paper making machine of the class described provided in operation with a forming wire loop and having non-shaking supporting structures outside and within said wire loop, a shakable breast roll supported on said structures, a shaking apparatus and means for vertically adjusting said structures and said shaking apparatus, said structures and said shaking apparatus remaining in substantially fixed relation and in relative alignment in vertical adjustment.

49. In a paper making machine of the class described provided in operation with a forming wire loop and having non-shaking supporting structures outside and within said wire loop of a shakable breast roll supported on said structures, means for vertically adjusting the breast roll and said structures adjacent said breast roll, and a multiple length stroke shaking apparatus vertically adjustable with said structures and having substantially fixed relation and constant alignment with said structures and said breast roll in the adjustment thereof.

50. In a paper making machine of the class described provided in operation with a forming wire loop and having non-shaking supporting structures outside and within said wire loop and a breast end, a shakable breast roll on said structures, said structures being vertically adjustable at the breast end and in constant alignment, a multiple length stroke shaking apparatus, and means whereby said breast roll and said shaking apparatus are direct connected and vertically adjustable in substantially fixed relation.

51. In a Fourdrinier paper making machine provided in operation with a forming wire loop and having a breast end, the combination of a supporting structure for said wire loop, a paper stock inlet, and means for vertically adjusting the breast end of said supporting structure and said paper stock inlet in unison and through a relatively great range above the level position of said supporting structure.

52. In a Fourdrinier paper making machine provided in operation with a forming wire loop and having a breast end, the combination of a supporting structure for said wire loop, a paper stock inlet, means for vertically adjusting the breast end of said supporting structure and said paper stock inlet in unison and through relatively great range above the level position of said supporting structure, and shaking apparatus adjustable in unison with said supporting structure.

53. In a Fourdrinier paper making machine, the combination of a forming table, a breast roll and a couch roll constituting with said forming table and said breast roll a substantially unitary assembly, and an endless wire loop adapted for unitary and simultaneous application over said forming table, breast roll and couch roll.

54. In a Fourdrinier paper making machine, the combination of a forming table, a breast roll and a couch roll constituting with said forming table and said breast roll a substantially unitary assembly, an endless wire loop adapted for unitary and simultaneous application over said forming table, breast roll and couch roll, and means for unitary vertical adjustment of the breast roll end of said assembly.

55. In a Fourdrinier paper making machine, the combination of a forming table, a breast roll and a couch roll constituting with said forming table and said breast roll a substantially unitary assembly, said assembly being shakable and adjustable vertically as a unit, an endless wire loop adapted for unitary and simultaneous application over said forming table, breast roll and couch roll, said unitary assembly being laterally removable to the side of the machine for application of said wire.

56. In a Fourdrinier paper making machine provided in operation with an endless forming wire loop, the combination of wire supporting and paper forming means disposed in operation within the wire loop and constituting a unitary assembly removable selectively to the front side or back side of the machine for application of said wire.

57. In a Fourdrinier paper making machine provided in operation with an endless forming wire loop, the combination of a structure adapted for disposition within the wire loop, said wire loop being adapted for unitary and simultaneous application over all structures within the loop by relative lateral movement between said structure and said loop.

58. In a Fourdrinier paper making machine, the combination of an endless forming wire loop and a structure including a forming table disposed in operation within said loop and adapted for application of the wire over said forming table with said table in substantially normal operative position.

59. In a Fourdrinier paper making machine, the combination of an endless forming wire loop and a structure including a forming table disposed in operation within said loop and adapted for application of the wire loop over said forming table optionally by lateral movement of the wire loop over said table or by lateral movement of the table into position within the wire loop.

60. In combination, multiple installed Fourdrinier paper making machines disposed parallel and adjacent with one alongside the other, and a wire replacement system adapted for replacing endless wire loops on both said machines simultaneously, the wire loop being placed on one of said machines by lateral movement of the machine within the wire loop and the wire loop being placed on the adjacent parallel machine by lateral movement of the wire loop over the machine structure disposed in operation within the loop.

61. In combination, multiple installed Fourdrinier paper making machines disposed parallel and adjacent with one alongside the other, and a wire replacement system adapted for placing endless wire loops on both of said machines at the same time and through an aisle less in width than the width of either machine.

62. In a paper making machine plant layout, the combination of multiple installed Fourdrinier paper making machines in parallel relation and a wire replacement system whereby endless wire loops are replaced over two opposite machines at the same time, one endless wire loop being replaced from the front side and the adjacent wire loop being replaced from the back side of their respective machines.

63. In a paper making machine plant layout, the combination of multiple installed Fourdrinier paper making machines disposed in parallel relation, an intermediate aisle between said machines, an alcove laterally aligned with the rear of one of said machines, an alcove laterally aligned with the front of the other machine, and means for replacing endless wire loops over both machines at the same time.

64. In combination, a pair of Fourdrinier paper making machines disposed in parallel arrangement and lateral alignment, an aisle between said machines, said aisle being of a width less than the width of each of said machines, and means for placing endless wire loops over both machines at the same time without interference between said machines.

65. In combination, a Fourdrinier paper making machine, a shaking apparatus for said machine, and means for adjusting the machine vertically without changing the relation between the shaking apparatus and the machine.

66. In combination, a Fourdrinier paper making machine, a shaking apparatus for said machine, and common means for adjusting the machine and the shaking apparatus in unison.

67. In a Fourdrinier paper making machine, the combination of a breast end structure, and vertically adjustable compensating means for said breast end structure, said breast end structure being held in alignment by said vertically adjustable compensating means.

68. In a Fourdrinier paper making machine, the combination of a non-shakable breast end structure and non-shakable vertically adjustable compensating means holding said breast end structure in alignment.

69. In a Fourdrinier paper making machine, the combination of a breast end structure, vertically adjustable compensating means holding said breast end structure in alignment, and a ball and socket support for said vertically adjustable compensating means.

70. In a paper making machine having a press section arrangement consisting of a frame structure, a plurality of felt carrying rolls, a plurality of suction press rolls, a top press roll, and an endless felt trained around said roll structure and between the suction press rolls and top press rolls and adapted for supporting a paper web, said endless felt passing between normally positioned suction press roll and a top press roll resting thereon around a carrying hitch roll and returning between an auxiliary bottom suction press roll and the normal top press roll, the paper web supported on said endless felt being pressed twice with one top roll and a hitch loop in said endless felt compensating for a pressure stretch in said endless felt and paper web between the first and second pressure rolls.

71. In a paper making machine having a press section arrangement consisting of a frame structure, a plurality of felt carrying rolls, a bottom suction press roll, a top press roll bearing thereon, an auxiliary press roll, bearing against said top press roll, and an endless felt trained around said carrying rolls and between said suction press roll and top press roll, said rolls forming a water removal pressure for a paper web supported on said felt, said paper web passing around said top press roll and between said top press roll and said auxiliary press roll, said auxiliary press roll acting as a smooth roll.

72. In a paper making machine having a press section arrangement consisting of a frame structure, a plurality of felt carrying rolls, a bottom suction press roll, a top press roll bearing thereon, an auxiliary press roll bearing against said top press roll, an endless felt trained around said carrying rolls and between said suction press roll and said top press roll, said rolls forming a water removal pressure for a paper web supported on said felt, said paper web passing around said top press roll and between said auxiliary press roll, said top press roll and auxiliary roll provided with doctor blades respectively, a series of drying cylinders, and means to remove automatically said paper web from said top and auxiliary rolls to said drying cylinders.

73. In a paper making machine having a press section arrangement, a frame supporting felt rolls, a bottom suction press roll, an auxiliary suction press roll, a top press roll coacting therewith and bearing thereon, said press roll having a doctor blade journaled on the frame pivotally, said doctor blade resting on the face of said top press roll and self-adjustable therewith, and a conveying trough in front and adjacent said press roll for conveying broke paper material removed from said top press roll to said intermediate doctor blade.

74. In a paper making machine having a press section arrangement, a frame supporting press rolls, a bottom press roll, a top press roll, a doctor blade coacting with the face of said press roll and journaled adjustably on said frame, and a conveying trough in front and adjacent to said top roll and beneath said doctor blade, said doctor blade receiving paper stock material from the face of said top press roll and discharging said paper stock material over and down into said conveying trough by the accumulated pressure of said paper stock material.

75. In a paper making machine having a press section arrangement of the class described, a top press roll, a conveying trough in front of said top press roll, and a doctor blade coacting with said top press roll to receive broke paper stock material from said top press roll and discharge said broke paper stock material into said conveying trough.

76. In a paper making machine having an endless carrier, the combination of a frame supporting the rolls on which the carrier travels with means to support said frame, one of said means consisting of a member spaced below a side member of said frame, means to support the side member from said first mentioned member in said spaced relation, revolvable members carried by said side member and said other member between which the said endless carrier may be fed into operative position.

77. In combination with the machine set forth in claim 76 members adapted to be placed in pairs between the revolvable members with the endless carrier therebetween.

78. In combination with the machine set forth in claim 76 means for driving certain of said revolvable members.

79. In combination with the machine set forth in claim 76, a couch roll on a separate set of bearings, one of said bearings being provided with a cooperating set of revolvable members, and means for driving certain of said revolvable members.

80. In combination with the machine set forth in claim 76, said supporting means consisting of removable blocks and means to bolt the side member and said first mentioned member to said blocks.

81. In a Fourdrinier machine a set of table rolls and a frame therefor, means for supporting said frame, one of said means consisting of a support spaced therefrom and the other means attached directly to said frame, removable members between said spaced members, revolvable members carried in pairs by the frame and the spaced support adjacent the said removable members, apertures in the other support opposite the pairs of revolvable members, and pair of members adapted to be fed through the pairs of revolvable members and the apertures during a wire changing operation.

82. The method of applying a forming wire over a paper making machine having transverse rails and a structure normally disposed within the wire loop which comprises withdrawing the transverse rails laterally, stringing the wire laterally of the machine structure with its bottom run over said rails and slipping the wire loop over the machine structure by returning said rails laterally into position beneath the machine with an accompanying lateral movement of the wire loop.

83. The method of applying a forming wire loop over a paper making machine having transverse rails and a machine structure normally disposed within the wire loop which comprises withdrawing the machine structure laterally, stringing the wire over said rails and supporting the bottom run of the wire upon said rails and stepping the machine structure into the wire loop by returning said machine structure laterally to substantially normal operating position over said rails and over the bottom run of the wire loop.

84. In a paper making machine having a structural part normally disposed within the wire loop the combination of means for stringing the forming wire laterally of said structural part, said wire being applied over said structural part by relative lateral movement between said part and the forming wire and means for sustaining the weight of said structural part from outside the wire loop and along the bottom run of the loop in the application of the wire.

85. In a paper making machine having a structural part normally disposed within the wire loop the combination of means for stringing the wire laterally of said structural part, said wire being applied over said part by relative lateral movement between said part and the wire and means for sustaining the weight of said structural part thru and from beneath the bottom run of the wire loop in the application of the wire to said part.

86. In a paper making machine having a machine structure normally disposed within the wire loop the combination of means for stringing the wire laterally of the machine structure, an outer rail member beneath the bottom run of the wire, an inner rail member within the wire loop and upon the top of the bottom run of the wire and along said outer rail member and means for producing relative lateral movement between the machine structure and said inner and outer rail members with an accompanying relative lateral movement between the wire and said machine structure for applying the wire loop over said structure.

87. In a paper making machine having a machine structure normally disposed within the wire loop the combination of means for stringing the wire laterally of the machine, an outer rail member disposed outside the wire loop and beneath the bottom run of the wire, an inner rail member disposed within the wire loop upon the top of the bottom run of the wire and along said outer rail member, said inner and outer rail members constituting a rail assembly and a gear in meshing engagement with rack teeth on said rail assembly and adapted to produce relative lateral movement between the rail assembly and the machine structure for applying the wire loop over said structure.

88. In a paper making machine having a machine structure normally disposed within the wire loop the combination of transverse rail means adapted for lifting the machine structure over and on the bottom run of the wire loop by relative lateral movement between it and the machine structure.

89. In a paper making machine provided in operation with a forming wire loop and having a machine structure normally disposed within the wire loop and removable laterally therefrom, the combination of means for stringing the wire laterally of the machine, means for spreading the wire loop at one end of the machine, means for supporting one of the wire poles on one of the structural parts of the machine for movement longitudinally toward the opposite end of the machine for the purpose of stringing the wire to that end, and means for spreading the opposite end of the loop and for applying the wire loop over the machine.

90. A plant for making paper including apparatus consisting of a Fourdrinier machine having a looped forming wire thereon including a plurality of removable, geared, auxiliary lifts placeable laterally of the machine and serving as supporting structures for effecting relative transverse movement between said wire and the machine for replacing the wire thereon.

91. A rail assembly for applying a forming wire to a paper making machine, said rail assembly comprising a lower rail disposed outside the wire loop and beneath the bottom run of the wire and an upper pad rail adapted to be disposed within the loop and upon the top of the bottom run of the wire over said lower rail, the bottom run of the wire being adapted for disposition between said rails in application of the wire to the machine.

92. A rail assembly for applying a forming wire to a paper making machine, said rail assembly comprising a lower rail disposed outside the wire loop and beneath the bottom run of the wire and having a recess in its upper surface of a width to receive the width of the wire, an upper pad rail adapted to be disposed within the loop and in said recess upon the top of the bottom run of the wire, the bottom run of the wire being adapted to be disposed between said rails in application of the wire to the machine.

JAMES K. DARBY.